(12) United States Patent
Furukawa

(10) Patent No.: US 10,728,399 B2
(45) Date of Patent: Jul. 28, 2020

(54) SPECTRAL COLORIMETRY APPARATUS AND IMAGE FORMING APPARATUS TO CONTROL THE NUMBER OF DETECTION TIMES

(71) Applicant: CANON KABUSHIKI KAISHA, Tokyo (JP)

(72) Inventor: Hitoshi Furukawa, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/205,026

(22) Filed: Nov. 29, 2018

(65) Prior Publication Data

US 2019/0182387 A1    Jun. 13, 2019

(30) Foreign Application Priority Data

Dec. 8, 2017    (JP) .................................. 2017-236512

(51) Int. Cl.
| | | |
|---|---|---|
| *H04N 1/00* | (2006.01) | |
| *G01J 3/02* | (2006.01) | |
| *G01J 3/50* | (2006.01) | |
| *H04N 1/40* | (2006.01) | |
| *B41J 2/205* | (2006.01) | |

(52) U.S. Cl.
CPC ........ *H04N 1/00023* (2013.01); *G01J 3/0297* (2013.01); *G01J 3/502* (2013.01); *H04N 1/00034* (2013.01); *B41J 2/2054* (2013.01); *B41J 2/2056* (2013.01); *H04N 1/40081* (2013.01); *H04N 1/40087* (2013.01)

(58) Field of Classification Search
CPC ........... H04N 1/00015; H04N 1/00023; H04N 1/00034; H04N 1/00039; H04N 1/00045; H04N 1/00063; H04N 1/00068; H04N 1/00082; H04N 1/00087; H04N 1/2315; H04N 1/2346; H04N 1/40006; H04N 1/4076; H04N 1/4078; H04N 1/4005; H04N 1/4015
See application file for complete search history.

(56) References Cited

U.S. PATENT DOCUMENTS

| | | | |
|---|---|---|---|
| 8,873,045 B2 | 10/2014 | Ebihara et al. | ......... G01J 3/502 |
| 9,164,456 B2 | 10/2015 | Koyama | ............ G03G 15/5062 |
| 10,041,834 B2 | 8/2018 | Nakai et al. | .............. G01J 3/40 |

(Continued)

FOREIGN PATENT DOCUMENTS

| | | |
|---|---|---|
| JP | 2000-097774 | 4/2000 |
| JP | 2013-040799 | 2/2013 |

(Continued)

*Primary Examiner* — Benny Q Tieu
*Assistant Examiner* — Haris Sabah
(74) *Attorney, Agent, or Firm* — Venable LLP

(57) ABSTRACT

The spectral colorimetry apparatus includes an LED, a diffraction grating; a line sensor that has multiple pixels and that receives light dispersed by the diffraction grating at the multiple pixels for respective wavelengths of the dispersed light and outputs voltages according to the intensity of the received light; and a sensor CPU that calculates spectral reflectivity of an object based on the intensity of light reflected from the object. The sensor CPU varies, with the multiple pixels, the number of detection times of detecting the light reflected from the object at each pixel.

17 Claims, 12 Drawing Sheets

(56) References Cited

U.S. PATENT DOCUMENTS

2014/0376932 A1* 12/2014 Koyama ............ G03G 15/5062
399/15
2016/0041034 A1* 2/2016 Nakai ....................... G01J 3/40
356/303
2017/0374260 A1* 12/2017 Ichikawa .................. H04N 9/07

FOREIGN PATENT DOCUMENTS

| JP | 2014-010246 | 1/2014 |
| JP | 2014-163839 | 9/2014 |
| JP | 2015-004811 | 1/2015 |

* cited by examiner

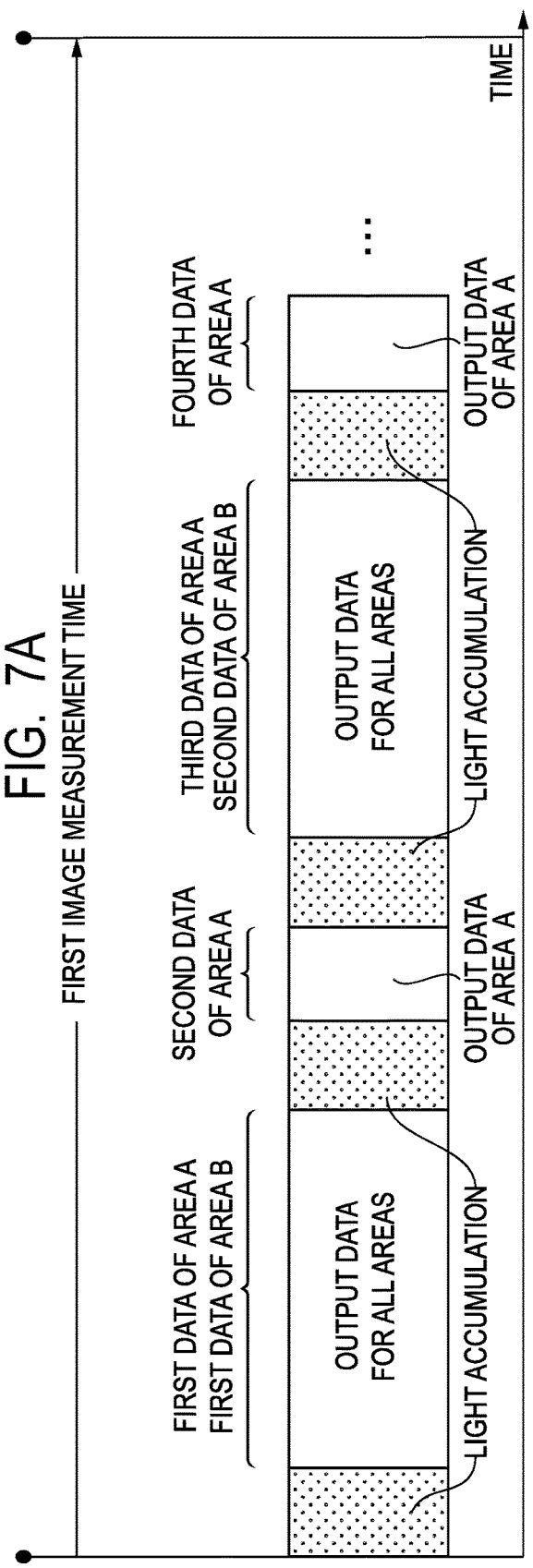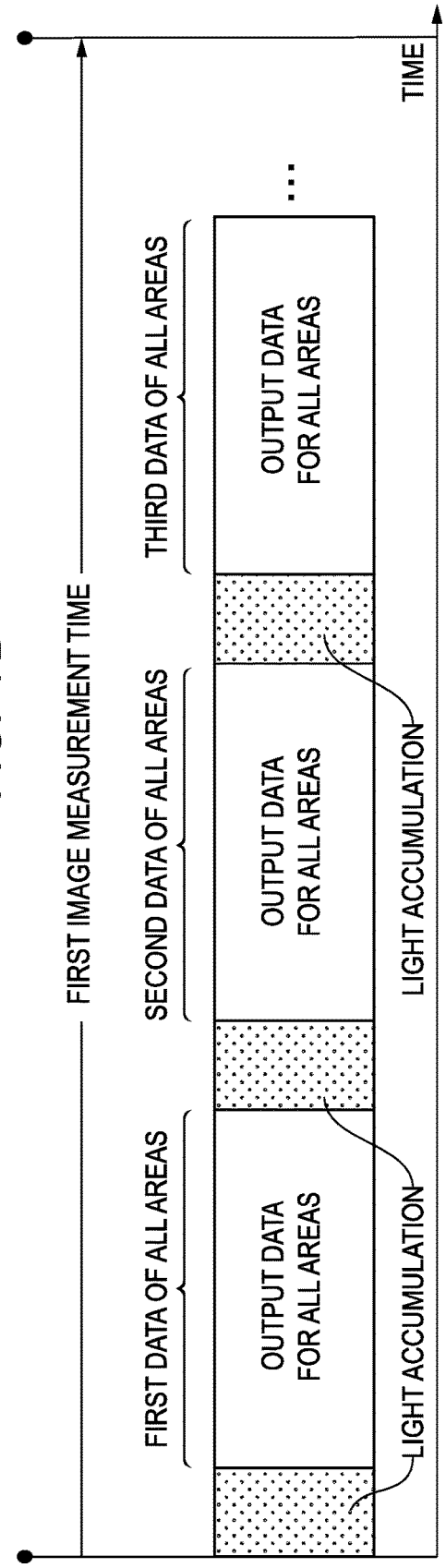

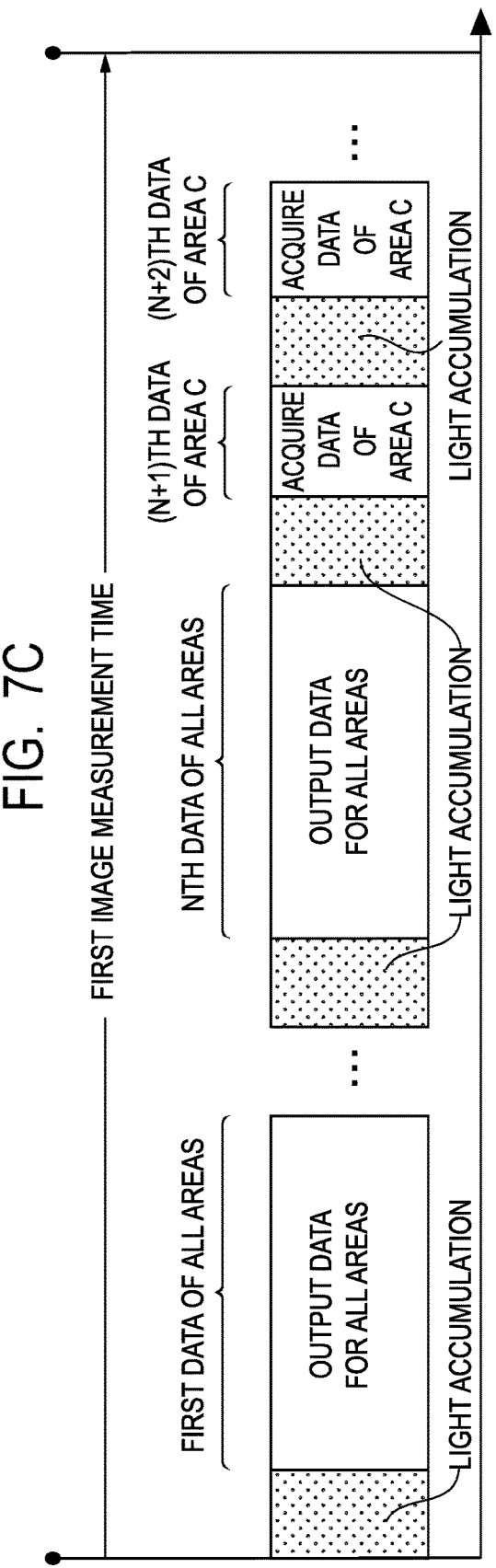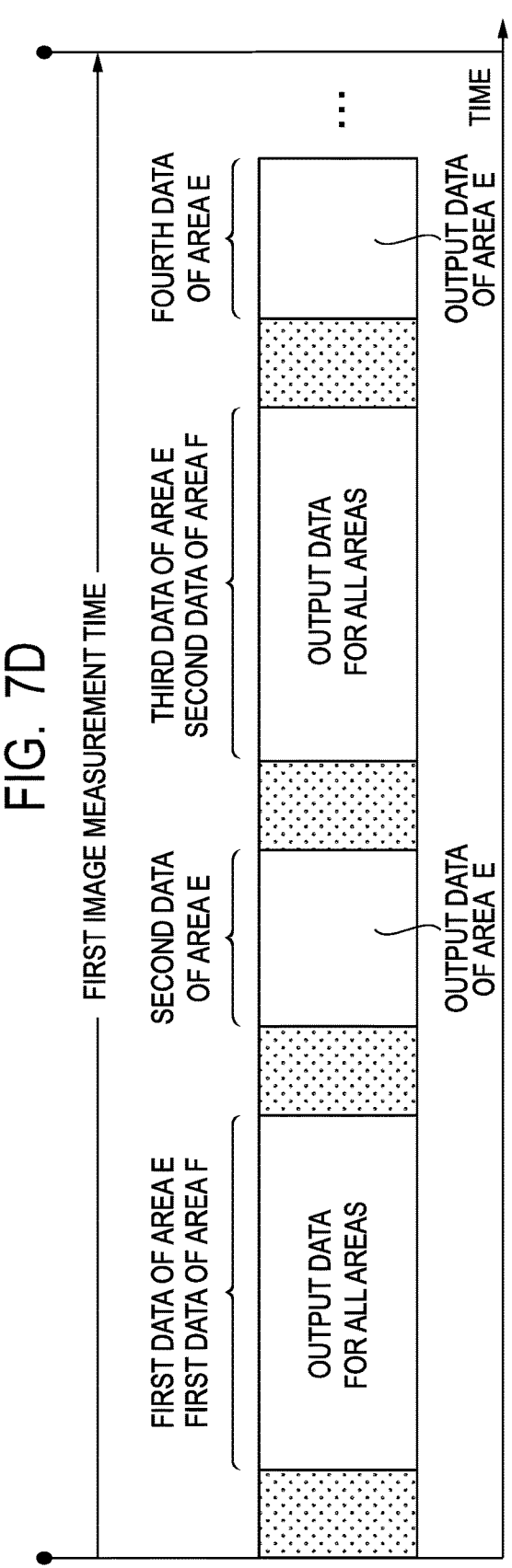

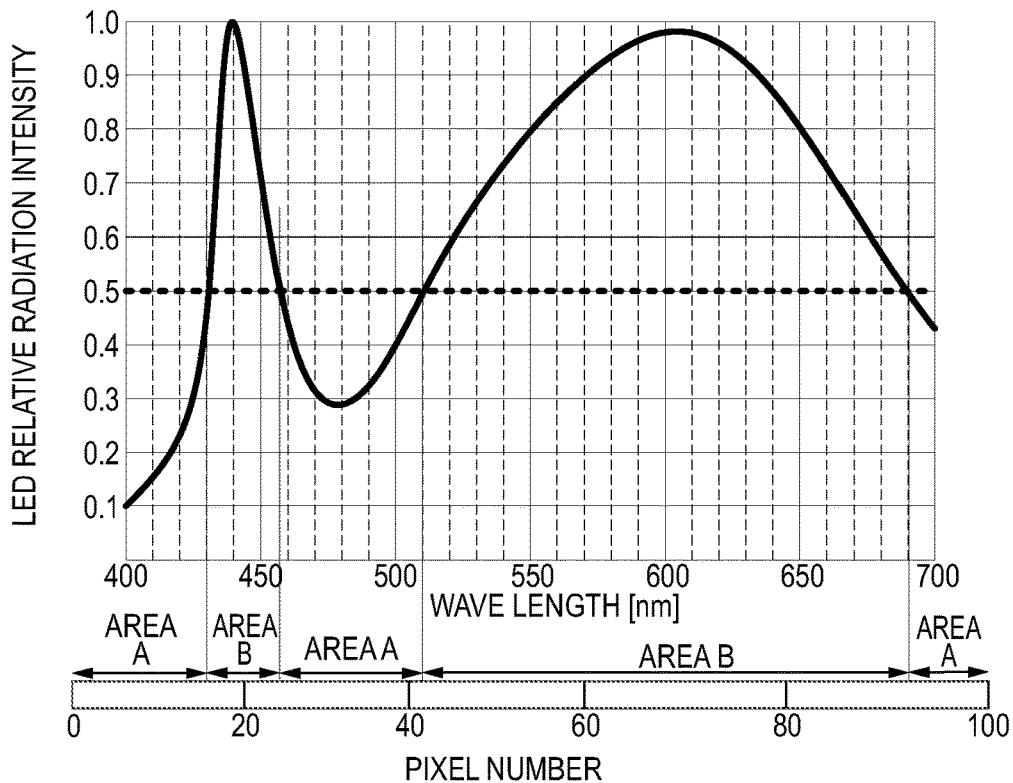
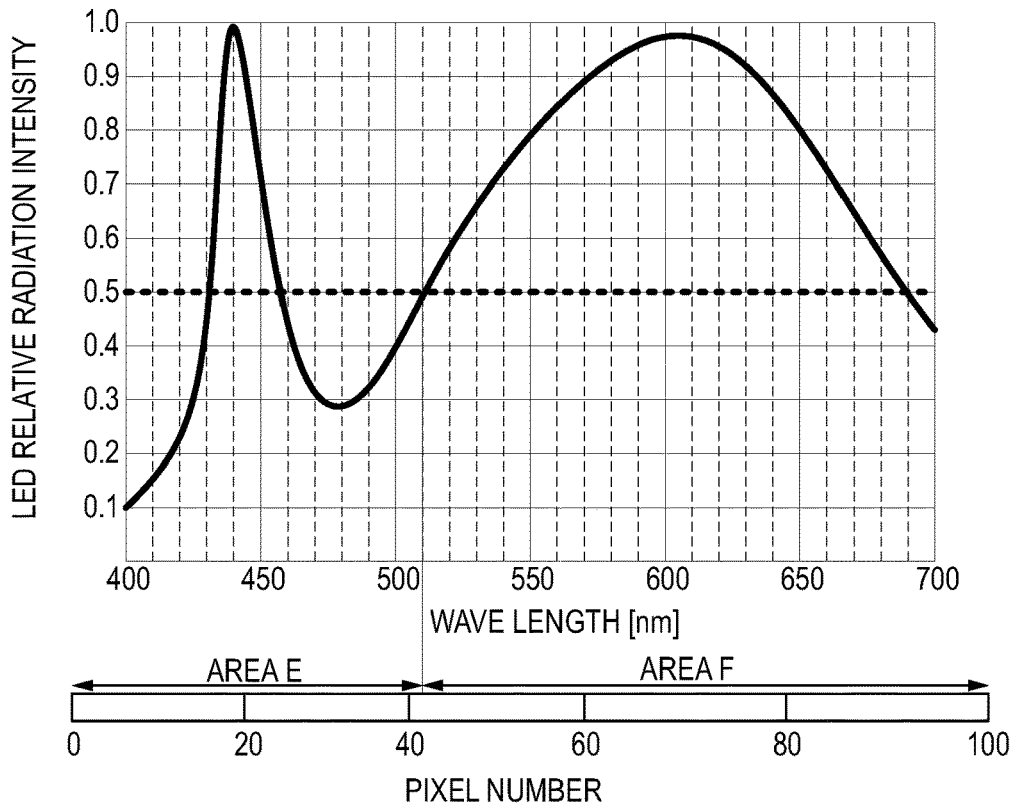

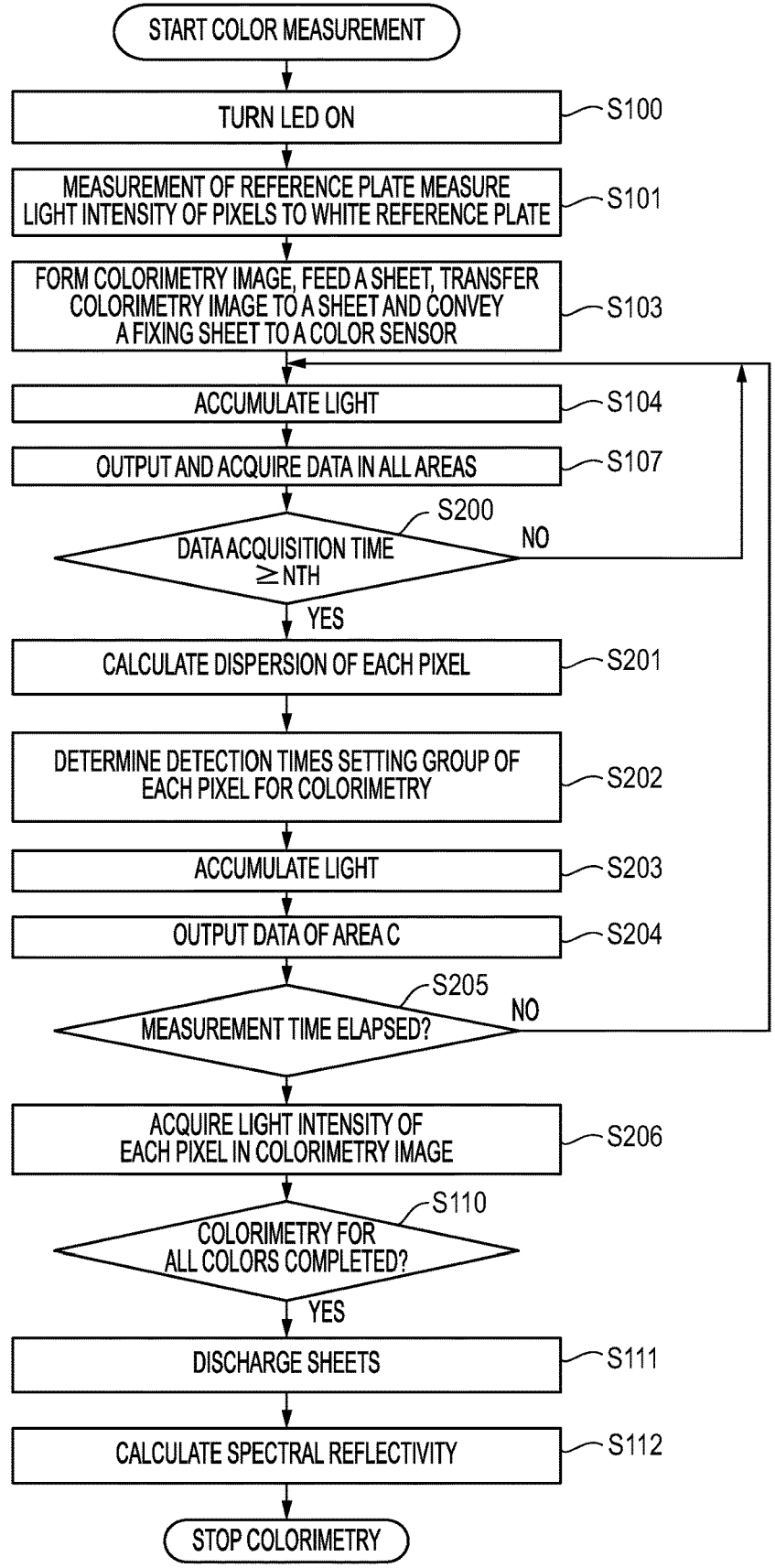

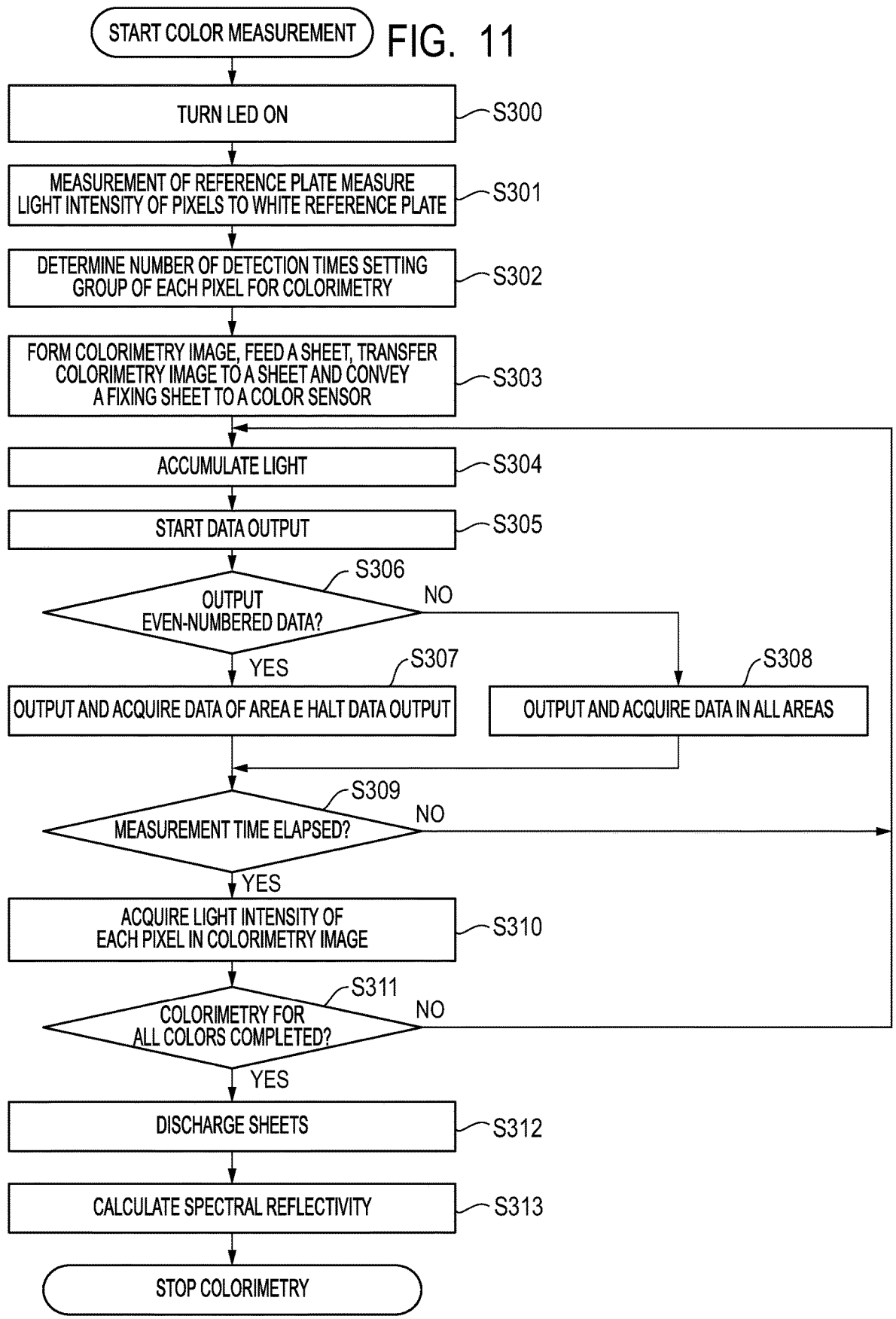

SPECTRAL COLORIMETRY APPARATUS AND IMAGE FORMING APPARATUS TO CONTROL THE NUMBER OF DETECTION TIMES

BACKGROUND OF THE INVENTION

Field of the Invention

The present invention relates to a spectral colorimetry apparatus and an image forming apparatus. More specifically, the present invention relates to a spectral colorimetry apparatus that performs colorimetry on images output by an image forming apparatus such as a laser printer, copier, or facsimile, and to an image forming apparatus incorporating the spectral colorimetry apparatus.

Description of the Related Art

In recent color image forming apparatuses, improvement of the quality of output images is required. Tones of output images and their stability, in particular, are important factors that determine the image quality. However, electrophotographic color image forming apparatuses have a characteristic of suffering changes in tone or hue of output images caused by variation factors of apparatus parts due to environmental variations and long-term use. For this reason, image forming apparatuses need to incorporate a measure for image quality correction for keeping constant tones and hues. One measure for image quality correction involves using each color of toner to form toner images (hereinafter referred to as patches) for tone detection or color correction on a sheet, so that a sensor (hereinafter referred to as a color sensor) detects the tone and color value of each patch fixed onto the sheet. A color image forming apparatus has been proposed that corrects the tones and color values of the toner images based on the result of detection by the above color sensor. One color sensor in use is a spectral colorimetry apparatus. A spectral colorimetry apparatus emits white light to a colorimetry object and detects, using a line sensor, the intensity of dispersed light resulting from dispersing the reflected light for each wavelength using a diffraction grating or prism. The line sensor varies in sensitivity, which causes errors in the detection result. Therefore, a reference plate is provided in the color sensor. The intensity of dispersed light from the reference plate is read under the same conditions as the colorimetry object, and the spectral reflectivity is calculated from the ratio between the intensity of the dispersed light from the reference plate and the intensity of the dispersed light from the colorimetry object. At this point, since the amount of general white light such as of an LED is not uniform over the full wavelength range, the dynamic range in reading the intensity of the dispersed light is narrow especially in wavelength ranges of small amounts of light. Japanese Patent Application Laid-Open No. 2000-97774, for example, proposes control to improve the dynamic range by changing the amount of white light for each wavelength to be detected. Japanese Patent Application Laid-Open No. 2013-40799 proposes control to change the amount of white light and the length of accumulation time period, at each inflection point in the distribution of the amounts of light.

However, such conventional examples have a problem of an increase in time period required for performing colorimetry as a result of changing the amount of white light and the length of accumulation time period of the line sensor. Also, if patches formed on a sheet are sensed by the color sensor provided in the image forming apparatus while the sheet is being conveyed, the time period available for performing colorimetry on each patch is limited. With the increase in time period required for performing colorimetry, the time period available for performing colorimetry on each patch may be exceeded.

SUMMARY OF THE INVENTION

An aspect of the present invention is a spectral colorimetry apparatus including a light source configured to emit light to an object, a spectral unit configured to disperse the light reflected from the object, a line sensor having pixels, the line sensor configured to receive the light dispersed by the spectral unit at the pixels for respective wavelengths to output a voltage according to intensity of the light received, and a control unit configured to calculate spectral reflectivity of the object based on the intensity of the light reflected from the object, wherein the control unit performs control to vary a number of detection times to detect the object per pixels.

Another aspect of the present invention is an image forming apparatus including a spectral colorimetry apparatus including a light source configured to emit light to an object, a spectral unit configured to disperse the light reflected from the object, a line sensor having pixels, the line sensor configured to receive the light dispersed by the spectral unit at the pixels for respective wavelengths to output a voltage according to intensity of the light received, and a control unit configured to calculate spectral reflectivity of the object based on the intensity of the light reflected from the object, herein the control unit performs control to vary a number of detection times to detect the object per pixels, a forming unit configured to form a measurement image on a recording material as the object, and a fixing unit configured to fix the measurement image formed by the forming unit on the recording material, wherein the spectral colorimetry apparatus is provided downstream of the fixing unit in a conveyance direction of the recording material, and the spectral colorimetry apparatus performs colorimetry on the measurement image fixed by the fixing unit onto the recording material.

A further aspect of the present invention is an image forming apparatus including a forming unit configured to form a measurement image on a recording material as an object, a fixing unit configured to fix the measurement image formed by the forming unit on the recording material, a spectral colorimetry apparatus provided downstream of the fixing unit in a conveyance direction of the recording material, the spectral colorimetry apparatus configured to perform colorimetry on the measurement image fixed by the fixing unit onto the recording material, and a control unit configured to control an image forming condition based on a result of the colorimetry performed by the spectral colorimetry apparatus, the spectral colorimetry apparatus including a light source configured to emit light to an object, a spectral unit configured to disperse the light reflected from the object, and a line sensor having pixels, the line sensor configured to receive the light dispersed by the spectral unit at the pixels for respective wavelengths to output a voltage according to intensity of the light received, wherein the control unit performs control to vary a number of detection times to detect the object per pixels.

Further features of the present invention will become apparent from the following description of exemplary embodiments with reference to the attached drawings.

BRIEF DESCRIPTION OF THE DRAWINGS

FIGS. 7A, 7B, 7C and 7D are sequence diagrams of colorimetry control in the first to third embodiments.

FIG. 8A is a diagram illustrating LED relative radiation intensity in the first to third embodiments.

FIG. 8B is a diagram illustrating pixel group selection.

FIG. 9 is a flowchart illustrating the colorimetry control in the second embodiment.

FIG. 11 is a flowchart illustrating the colorimetry control in the third embodiment.

DESCRIPTION OF THE EMBODIMENTS

Preferred embodiments of the present invention will now be described in detail in accordance with the accompanying drawings.

With reference to the drawings, preferred embodiments of the present invention will be described in detail below by way of example. It is to be noted that components described in the embodiments are only exemplary and not intended to limit the scope of the present invention.

First Embodiment

[Configuration of Image Forming Apparatus]

Figure 1:
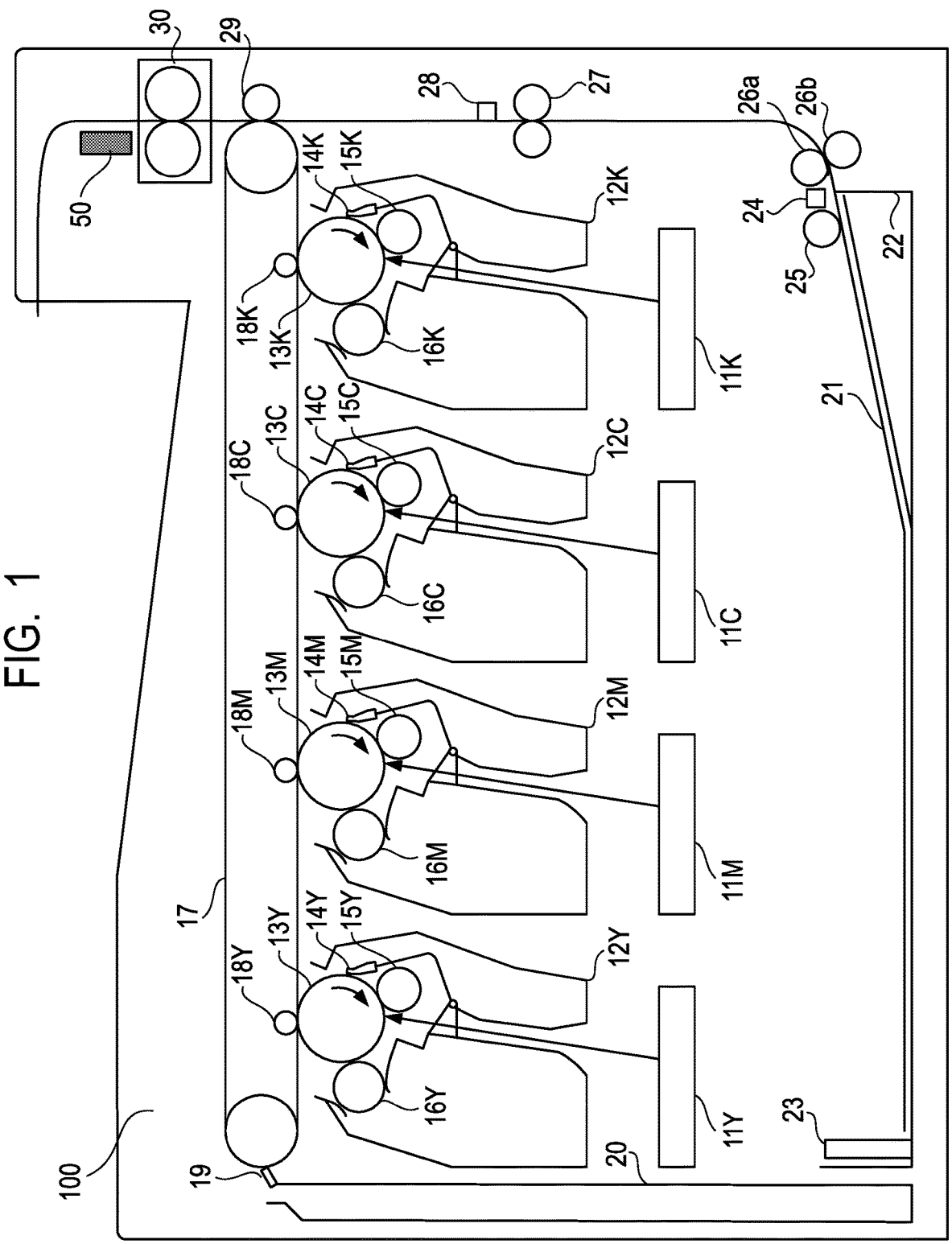
FIG. 1 is a configuration diagram illustrating an entire image forming apparatus in first to third embodiments.

FIG. 1 is a configuration diagram illustrating an entire image forming apparatus in a first embodiment. The image forming apparatus 100 is configured to output full-color images by layering four colors of toner: yellow (Y), magenta (M), cyan (C) and black (K). Indices Y, M, C and K of reference signs in FIG. 1 represent the respective colors. It is to be noted that the indices Y, M, C and K of the reference signs will be omitted except where members of a particular color is described. A laser scanner 11 and a cartridge 12 are provided for image forming of each color. The cartridge 12 includes a photosensitive drum 13 (a photosensitive member) that rotates in the direction of an arrow in FIG. 1 (clockwise), a cleaning blade 14 provided to contact the photosensitive drum 13, a charge roller 15, and a development roller 16.

The cleaning blade 14 has flexibility (rubber elasticity) and contacts the photosensitive drum 13 at a predetermined pressure to wipe the surface of the photosensitive drum 13, so that toner remaining on the photosensitive drum 13 after transferred from the surface of the photosensitive drum 13 is scraped and removed. In order to improve cleaning efficiency, the cleaning blade 14 is arranged in contact with the photosensitive drum 13 to oppose the rotation direction in image forming. Further, an intermediate transfer belt 17 is provided in contact with the photosensitive drums 13 of the four colors, and a primary transfer roller 18 is provided to face each photosensitive drum 13 with the intermediate transfer belt 17 in between. The intermediate transfer belt 17 is provided with a belt cleaner 19, where scraped toner is put in a waste toner container 20. A cassette 22 holding a sheet 21 (a recording material) is provided with a size guide 23 that regulates the position of the sheet 21 in the cassette 22, and a sheet presence sensor 24 that detects the presence or absence of the sheet 21 in the cassette 22. On the conveyance path of the sheet 21 are a sheet feed roller 25, a separation rollers 26a and 26b, and a registration roller 27. A registration sensor 28 is provided near the registration roller 27 on the downstream side in the sheet conveyance direction. A secondary transfer roller 29 is provided to contact the intermediate transfer belt 17, and a fixing device 30 is provided downstream of the secondary transfer roller 29. A color sensor 50 is provided downstream of the fixing device 30 for reading color value information about a fixed toner image.

[Configuration of Color Sensor]

Figure 2A:
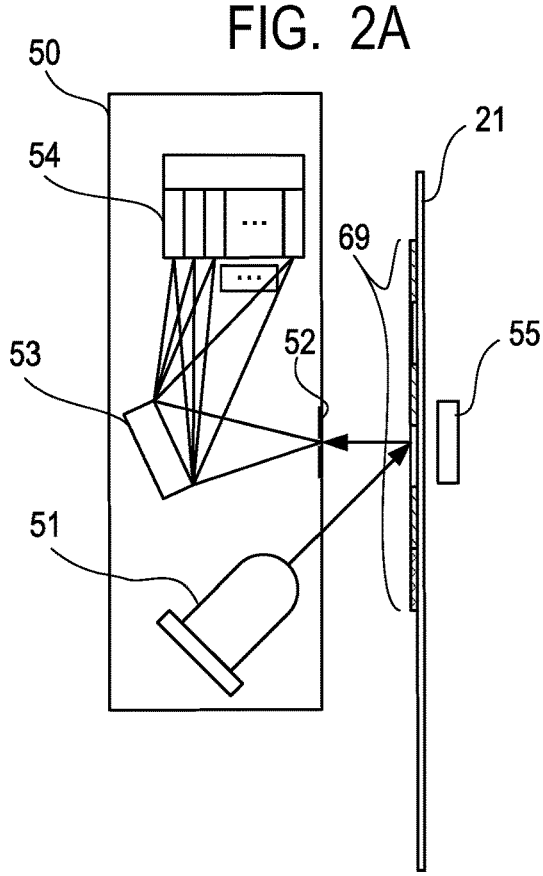
FIG. 2A is a configuration diagram of a color sensor in the first to third embodiments.
Figure 2B:
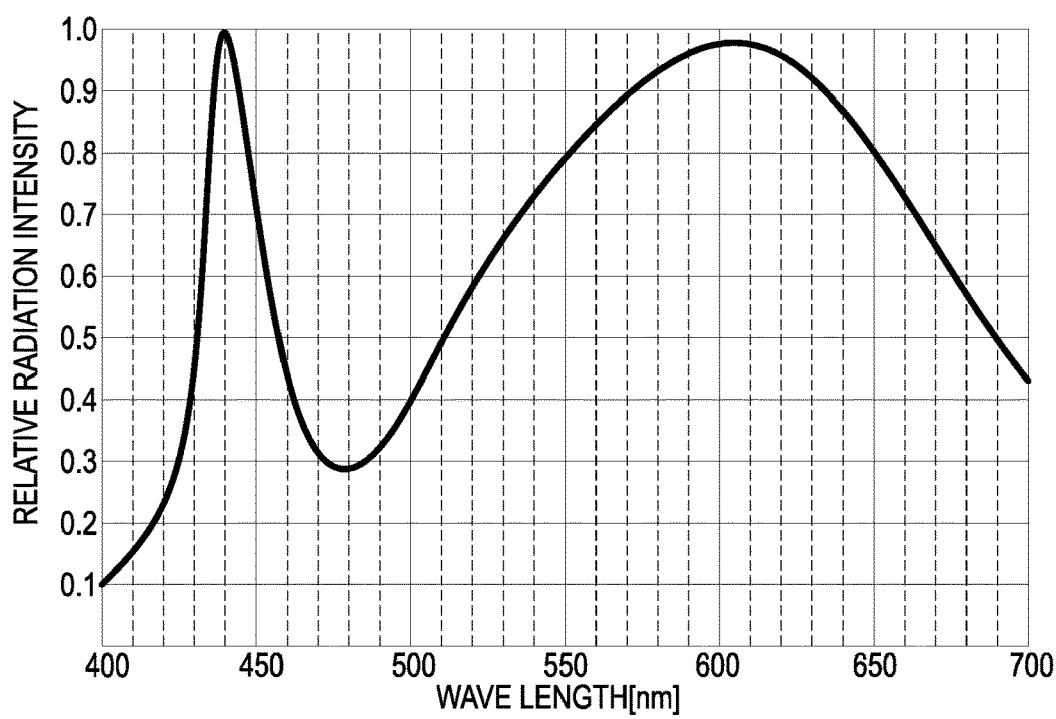
FIG. 2B is a spectral shape diagram of an LED.

FIG. 2A is a configuration diagram of the color sensor 50 in the first embodiment. A configuration of the color sensor 50 will be described with reference to FIG. 2A. The color sensor 50 includes an LED 51 serving as a light source, a slit 52, a diffraction grating 53 serving as a spectral unit, and a charge-storage line sensor (hereinafter referred to as a line sensor) 54. The LED 51 emits white light. The slit 52 prevents stray light toward light-receiving elements. The diffraction grating 53 disperses light reflected from a colorimetry object. The line sensor 54 acquires light rays resulting from dispersion by the diffraction grating 53. The LED 51 is an LED having a phosphor with excitation light at a wavelength of about 440 nanometers and the maximal fluorescence intensity at a wavelength of about 600 nanometers. FIG. 2B illustrates a spectral shape of the LED 51. In FIG. 2B, the horizontal axis represents the wavelength [nm (nanometer)] and the ordinate indicates the relative radiation intensity of the LED 51. In FIG. 2B, a peak at about 440 nm corresponds to the above-mentioned excitation light, and a peak at about 600 nm corresponds to the maximal fluorescence intensity of the phosphor.

The line sensor 54 has multiple pixels, for example 100 pixels, for respectively receiving and detecting wavelengths from about 380 nanometers to about 720 nanometers. A white reference plate 55 (a reference plate) for calibrating the color sensor 50 is provided to face the color sensor 50. In the absence of the sheet 21 at the color sensor 50, the white reference plate 55 is a measurement object (an object) of the color sensor 50. In FIG. 2A, images 69 are measurement objects formed by the image forming apparatus 100 on the sheet 21 (the recording material). Hereinafter, the images formed as measurement objects on the sheet 21 will be referred to as colorimetry images 69 serving as measurement images.

[Control Configuration]

Figure 3A:
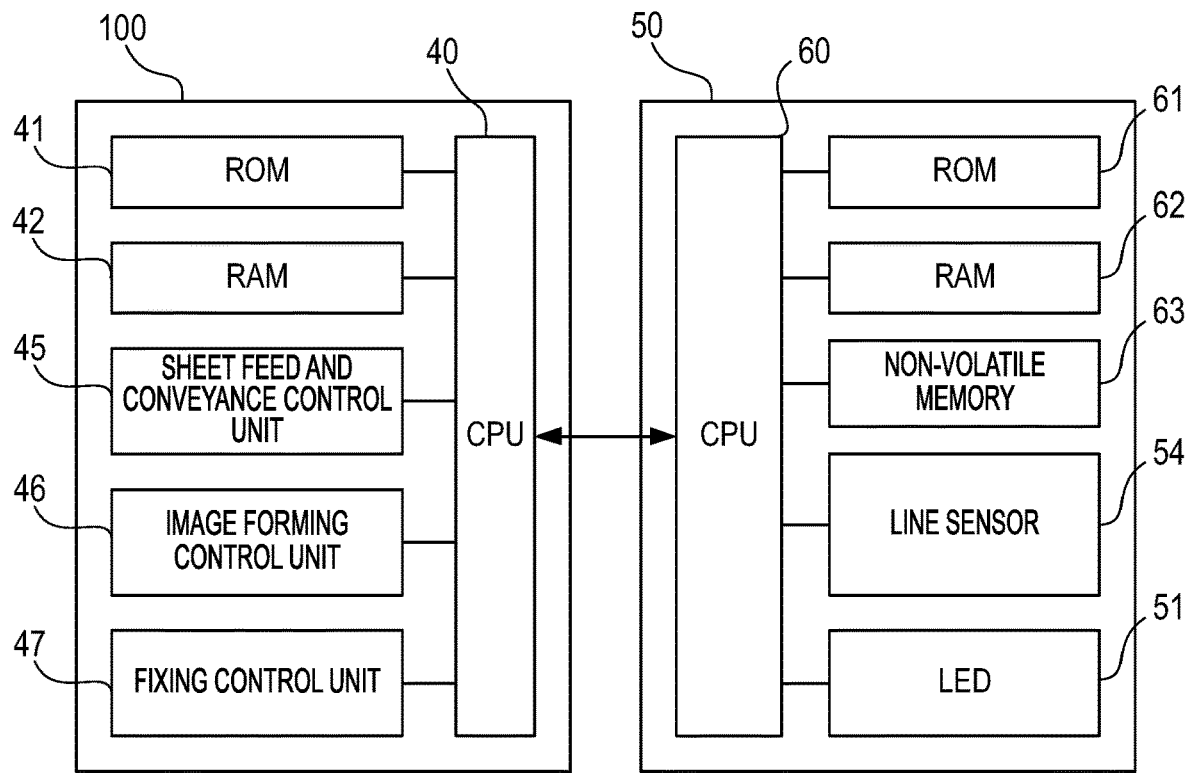
FIG. 3A is a configuration diagram of the image forming apparatus in the first to third embodiments.

FIG. 3A is a block diagram illustrating a control configuration of the image forming apparatus 100 and the color sensor 50. A CPU 40 (hereinafter referred to as an apparatus CPU 40) of the image forming apparatus 100 is connected with a ROM 41, a RAM 42, a sheet feed and conveyance control unit 45, an image forming control unit 46, a fixing control unit 47, and a CPU 60 (hereinafter referred to as a sensor CPU 60) of the color sensor 50. The apparatus CPU 40 uses the RAM 42 as a working area to perform various kinds of control relevant to the first embodiment based on program code stored in the ROM 41. The apparatus CPU 40 has a timer (not shown) and measures lapses of time periods required for various kinds of processing using the timer. The sheet feed and conveyance control unit 45 is a control unit that drives the sheet feed roller 25 and the registration roller 27 via a motor (not shown) to convey the sheet 21 to the position of the secondary transfer roller 29. The image forming control unit 46 is a control unit that drives the cartridge 12, the primary transfer roller 18 and the secondary transfer roller 29 via a motor (not show) and a high-voltage circuit (not shown) to form a toner image. The fixing control unit 47 is a control unit that controls driving of the fixing device 30 to fix an unfixed toner image formed on the sheet 21, and controls discharging of the sheet 21 out of the image forming apparatus 100.

The sensor CPU 60 is connected with a ROM 61, a RAM 62, a non-volatile memory 63, the LED 51, the line sensor 54, and the apparatus CPU 40 of the image forming apparatus 100. The sensor CPU 60 uses the RAM 62 as a working area to perform control relevant to the first embodiment based on program code stored in the ROM 61. The sensor CPU 60 has a timer (not shown) and measures lapses of time periods required for various kinds of processing using the timer. The sensor CPU 60 and the line sensor 54 are interconnected by a communication signal line for sending and receiving signals such as a reflected light accumulation instruction signal, a spectral data reading instruction signal, and an analog spectral data output signal. The reflected light accumulation instruction signal is a signal for indicating accumulation time period of reflected light to the line sensor 54. The spectral data reading instruction signal is a signal for instructing to read spectral data acquired by the line sensor 54. The analog spectral data output signal is a signal for outputting multiple spectral data items (analog values of the amounts of light) acquired by the line sensor 54.

The line sensor 54 is a charge-storage line sensor and outputs a voltage signal for each specified pixel according to the intensity (the light intensity) of dispersed light incident in a predetermined accumulation time period. In the first embodiment, the light accumulation time period of the line sensor 54 is 0.2 milliseconds, and the time period required for outputting voltage signals for all pixels is 0.8 milliseconds. The sensor CPU 60 uses a 12-bit analog-digital (hereinafter denoted as AD) converter (not shown) to AD-convert the voltage signal obtained for each pixel, thereby acquiring the light intensity at the pixel as a digital value in the range 0 to 4095. The non-volatile memory 63 holds wavelength information corresponding to each pixel of the line sensor 54. The amount of light emitted by the LED 51 is adjustable by the sensor CPU 60 as appropriate. The apparatus CPU 40 and the sensor CPU 60 are interconnected by a communication signal line. The apparatus CPU 40 sends, to the sensor CPU 60 via the communication signal line, instructions such as an LED turn-on instruction, an LED turn-off instruction, a reference plate measurement instruction, an image measurement instruction, and a spectral reflectivity calculation instruction. The image measurement instruction includes information about the measurement time period.

Control performed by the sensor CPU 60 upon receiving the instruction signals from the apparatus CPU 40 will now be described. Upon receiving the LED turn-on instruction from the apparatus CPU 40, the sensor CPU 60 causes the LED 51 to illuminate as follows. The sensor CPU 60 causes the LED 51 to illuminate with a predetermined amount of light so that the maximum of values of the light intensity for the white reference plate 55 detected at the pixels by driving the line sensor 54 (hereinafter, the pixel with the maximum value will be referred to as a peak pixel) is around the detection limit value of the line sensor 54. In the first embodiment, around the detection limit value of the line sensor 54 is assumed to be around 4000 in terms of AD-converted digital value.

Upon receiving the LED turn-off instruction from the apparatus CPU 40, the sensor CPU 60 turns off the LED 51. Upon receiving the reference plate measurement instruction from the apparatus CPU 40, the sensor CPU 60 drives the line sensor 54 multiple times to measure the light intensity at each pixel for the white reference plate 55, and calculates the average of the measurements at the pixel. In the first embodiment, the measurement is performed 32 times, for example. Upon receiving the image measurement instruction from the apparatus CPU 40, the sensor CPU 60 drives the line sensor 54 multiple times in a specified time period to measure the light intensity at each pixel for the colorimetry images 69, and calculates the average of the measurements at the pixel. The number of measurement times performed upon reception of the image measurement instruction is a feature of the present invention and will be described in detail below. Upon receiving the spectral reflectivity calculation instruction from the apparatus CPU 40, the sensor CPU 60 calculates, based on the measurement results about the white reference plate 55 and the colorimetry images 69, the spectral reflectivity $Or(\lambda)$ of each colorimetry image 69 at each wavelength $\lambda$ from Equation (1) below.

$$\text{spectral reflectivity } Or(\lambda) = \{Oi(\lambda)/Wi(\lambda)\} \times Wr(\lambda) \quad \text{Equation (1)}$$

Where $Oi(\lambda)$ is the light intensity for each colorimetry image 69 detected at each wavelength $\lambda$. The wavelength corresponding to each pixel of the line sensor 54 is converted based on data held in the non-volatile memory 63. $Wi(\lambda)$ is the light intensity for the white reference plate 55 detected at each wavelength $\lambda$. $Wr(\lambda)$ is the spectral reflectivity of the white reference plate 55, stored in the non-volatile memory 63. After calculating the spectral reflectivity $Or(\lambda)$, the sensor CPU 60 sends the calculated spectral reflectivity $Or(\lambda)$ to the apparatus CPU 40. The apparatus CPU 40 controls image forming conditions based on the result of the colorimetry performed by the line sensor 54.

[Image Forming Control]

Image forming Control will now be described. Under the control of the above-described image forming control unit 46, the surface of the photosensitive drum 13 is uniformly charged by the charge roller 15 at a dark place in each cartridge 12. The surface of the photosensitive drum 13 is then irradiated by the laser scanner 11 with laser light modulated according to image data, so that charges in the portions irradiated with the laser light are removed. An electrostatic latent image is thus formed on the surface of the photosensitive drum 13. The development roller 16 applies charged toner to the electrostatic latent image to form a toner image of each color on the surface of the photosensitive drum 13. The toner image formed on the surface of each photosensitive drum 13 is sequentially transferred by the primary transfer roller 18 onto the intermediate transfer belt 17 in layers. Meanwhile, under the control of the sheet feed and conveyance control unit 45, the sheet 21 in the cassette 22 is conveyed by the sheet feed roller 25. If multiple sheets 21 are set, only one sheet 21 is conveyed to the registration roller 27 via the separation rollers 26a and 26b. The toner images on the intermediate transfer belt 17 are then transferred by the secondary transfer roller 29 onto the sheet 21 conveyed by the registration roller 27. Finally, under the control of the fixing control unit 47, the toner images on the sheet 21 are fixed by the fixing device 30, and the sheet 21 is discharged out of the image forming apparatus 100.

[Image Colorimetry Sequence]

Figure 4:
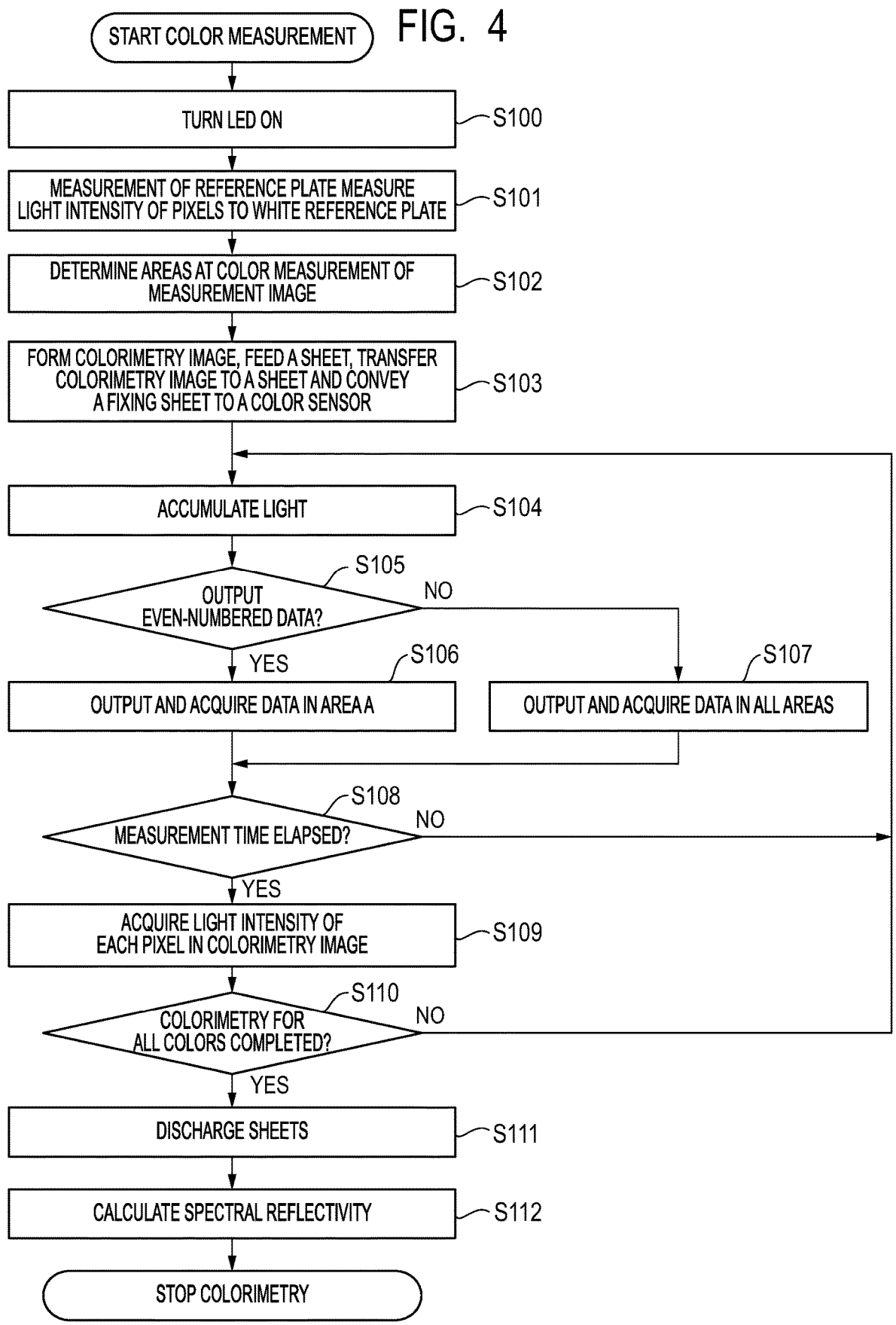
FIG. 4 is a flowchart illustrating colorimetry control in the first embodiment.
Figure 5:
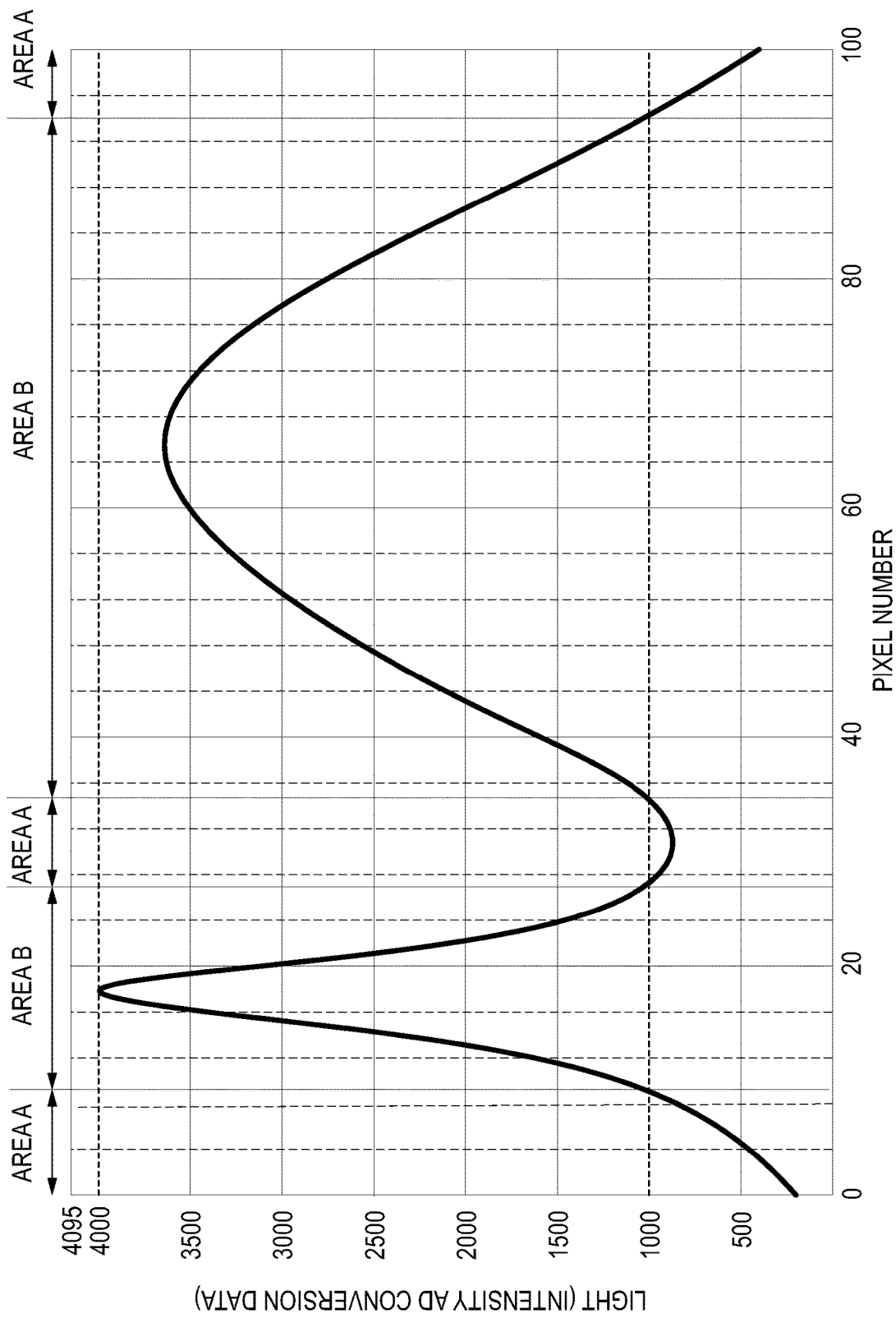
FIG. 5 is a diagram illustrating a measurement result about a white reference plate and pixel group selection in the first embodiment.

With reference to a flowchart of FIG. 4, the following describes an image colorimetry sequence, and a method of determining the number of detection times at each pixel of the line sensor 54, which is a feature of the first embodiment. Upon start of image colorimetry control, the apparatus CPU 40 or the sensor CPU 60 starts the process of step (hereinafter denoted as S) 100 and the subsequent steps. At S100, the apparatus CPU 40 sends the LED turn-on instruction to the sensor CPU 60 to cause the LED 51 to illuminate with a predetermined amount of light. At S101, the apparatus CPU 40 sends the reference plate measurement instruction to the sensor CPU 60 to measure the light intensity at each pixel for the white reference plate 55. FIG. 5 illustrates an example of the measurement result about the white reference plate 55. In FIG. 5, the horizontal axis represents the pixel number (0 to 100) of the line sensor 54, and the ordinate indicates AD-converted data (0 to 4095) about the light intensity of the light received at the pixel of each pixel number.

At S102, based on the measurement result about the white reference plate 55 at S101, the sensor CPU 60 divides the pixels of the line sensor 54 into areas in the following manner. The sensor CPU 60 divides the pixels of the line sensor 54 into a group (hereinafter referred to as an area A) of pixels with a greater detection frequency and a group (hereinafter referred to as an area B) of pixels with the number of detection times less than the number of detection times at the pixels in the area A. In the first embodiment, with respect to the AD-converted peak-pixel value 4000 for the white reference plate 55, the area A is defined to include pixels for which the detection result shows AD-converted values of less than ¼ (1000=4000/4). The area B is defined to include pixels for which the detection result shows AD-converted values of ¼ or higher. In this manner, in the first embodiment, the number of detection times at pixels receiving the reflected light of light intensity lower than a predetermined light intensity from the white reference plate 55 is made greater than the number of detection times at pixels receiving the reflected light of light intensity not lower than the predetermined light intensity. For example, for the detection result about the white reference plate 55 as in the graph of FIG. 5, the areas A and B are defined as shown in FIG. 5. In the example of FIG. 5, the area A includes 25 pixels in total, and the time period required for outputting voltage signals for the 25 pixels from the line sensor 54 is 0.20 (=0.8/100×25) milliseconds.

Figure 6:
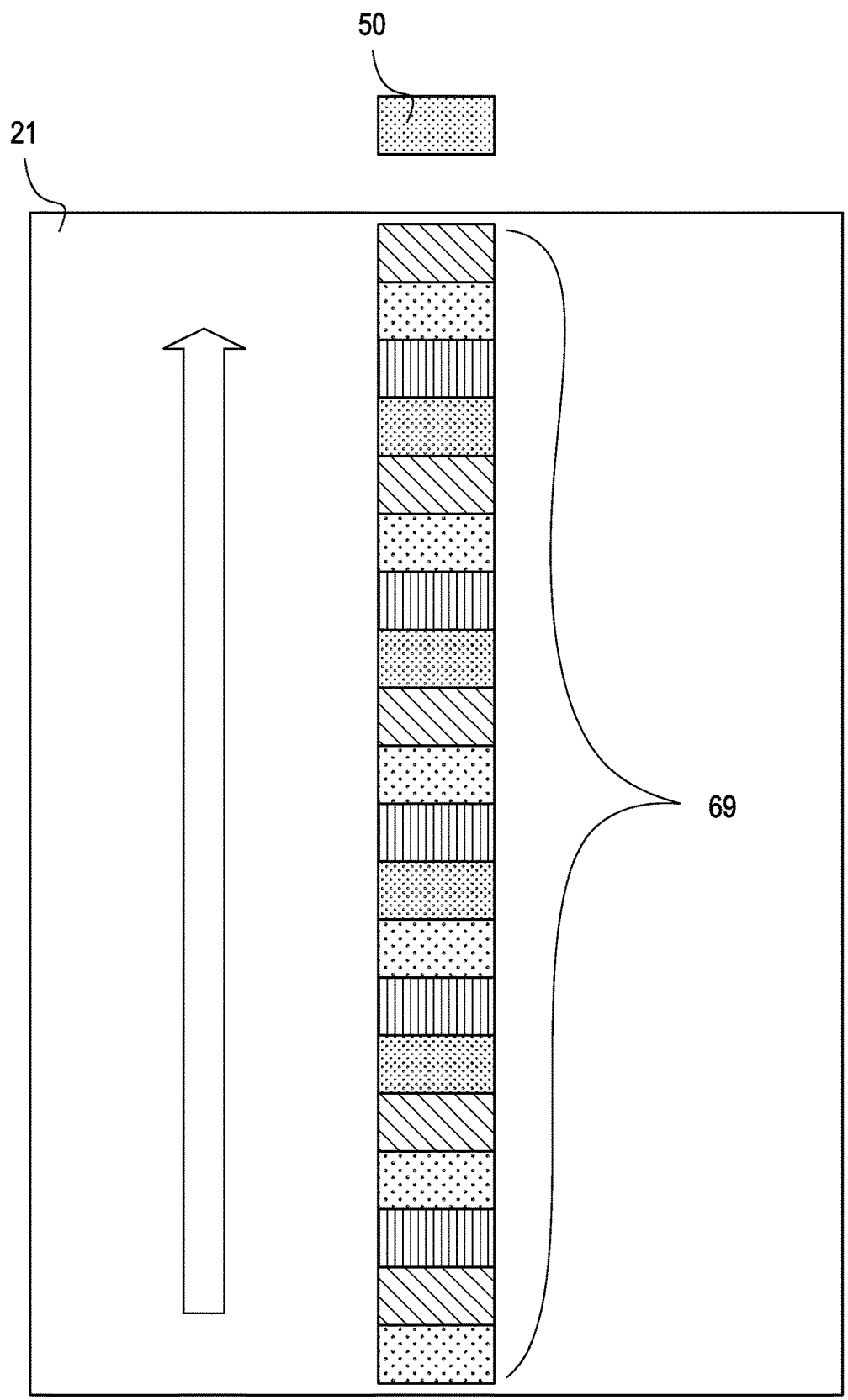
FIG. 6 is a layout diagram of colorimetry images in the first to third embodiments.

At S103, the apparatus CPU 40 forms the colorimetry images 69, feeds the sheet 21, transfers and fixes the colorimetry images 69 onto the sheet 21, and conveys the colorimetry images 69 on the sheet 21 to the position of the color sensor 50. FIG. 6 illustrates an example of the colorimetry images 69 transferred and fixed onto the sheet 21. An arrow in FIG. 6 indicates the conveyance direction of the sheet 21. It is to be noted that the shape, number, and tone of the colorimetry images 69 are arbitrary. In the first embodiment, as an example, the colorimetry images 69 have a length of 10 millimeters per image in the conveyance direction, in which an area of 8 millimeters in the middle of each image is used for performing colorimetry, and the sheet 21 is conveyed at a speed of 200 millimeters per second. Therefore, in the first embodiment, the time period available for measurement per image of the colorimetry images 69 while the sheet 21 is being conveyed is 40 (=8/200) milliseconds.

In S104, the apparatus CPU 40 sends the image measurement instruction to the sensor CPU 60 in synchronization with the arrival of one of the colorimetry images 69 at the color sensor 50 while the sheet 21 is being conveyed. Upon receiving the image measurement instruction, the sensor CPU 60 drives the line sensor 54 to start accumulation of the amount of reflected light from the colorimetry image 69 (light accumulation). The sensor CPU 60 accumulates the light through the line sensor 54 for a predetermined time period. The sensor CPU 60 also resets and starts the timer (not shown) upon start of the light accumulation, and starts measuring time period. At S105, the sensor CPU 60 drives the line sensor 54 to output spectral data acquired by the line sensor 54. At this point, the sensor CPU 60 determines, for the one of the colorimetry images 69, whether or not the data output is the even-numbered output. If it is determined that the data output is the even-numbered output at S105, the sensor CPU 60 advances the process to S106. If it is determined that the data output is not the even-numbered output, the sensor CPU 60 advances the process to S107. At S106, the sensor CPU 60 causes the line sensor 54 to output data about the pixels determined to belong to the area A at S102, thereby acquiring data about the pixels determined to belong to the area A. At S107, the sensor CPU 60 causes the line sensor 54 to output data about the pixels in all areas (the areas A and B) to acquire data about the pixels in all areas, and advances the process to S108.

At S108, the sensor CPU 60 determines whether or not the measurement time period of the line sensor 54 has elapsed by referring to the timer (not shown). If it is determined that the measurement time period has not been elapsed at S108, the sensor CPU 60 returns the process to S104. If it is determined that the measurement time period has been elapsed, the sensor CPU 60 advances the process to S109. At S109, the sensor CPU 60 performs AD conversion of the pixel data output from the line sensor 54 at S106 and S107 and acquires the light intensity at each pixel. The sensor CPU 60 averages the data about the colorimetry image 69 resulting from the multiple times of detection at each pixel, and regards the average for the pixel as the light intensity at the pixel for the colorimetry image 69. Here, since the area A and the area B had different detection frequencies due to the determination at S105 and thus produced different numbers of data items, averages of the respective frequencies are calculated.

FIG. 7A illustrates a sequence diagram in which the light accumulation and the data output are repeated during the measurement time period for one image (for example, 40 milliseconds as described above). In FIG. 7A, the horizontal axis represents time period. Upon start of the measurement time for one image, the sensor CPU 60 starts the light accumulation (S104). Since the first data output is not the even-numbered output (NO at S105), the sensor CPU 60 causes the line sensor 54 to output data about all areas (area A+area B) (S107). The data output at this time is the first data output for the area A and the first data output for the area B. As described above, outputting data about all areas requires 0.8 milliseconds. The sensor CPU 60 starts the light accumulation (S104), and since the second data output is the even-numbered output (YES at S105), the sensor CPU 60 causes the line sensor 54 to output data about the area A (S106). The data output at this time is the second data output for the area A. As described above, outputting data about the area A requires 0.2 milliseconds. The sensor CPU 60 starts the light accumulation (S104), and since the third data output is not the even-numbered output (NO at S105), the sensor CPU 60 causes the line sensor 54 to output data about all areas (area A+area B) (S107). The data output at this time is the third data output for the area A and the second data output for the area B. The sensor CPU 60 starts the light accumulation (S104), and since the fourth data output is the even-numbered output (YES at S105), the sensor CPU 60 causes the line sensor 54 to output data about the area A (S106). The data output at this time is the fourth data output for the area A. This process is continued thereafter until the end of the measurement time period.

At S110, the sensor CPU 60 determines whether or not the colorimetry has been completed for all of the colorimetry images 69 (all colorimetry images). If it is determined that the colorimetry has not been completed for all colorimetry images, the sensor CPU 60 returns the process to S105. If it is determined that the colorimetry has been completed for all colorimetry images, the sensor CPU 60 advances the process to S111. At S111, with the light intensity at each pixel for all of the colorimetry images 69 determined, the apparatus CPU 40 discharges the sheet 21 out of the image forming apparatus 100. At S112, the apparatus CPU 40 instructs the sensor CPU 60 to calculate the spectral reflectivity. The sensor CPU 60, upon receiving the spectral reflectivity calculation instruction from the apparatus CPU 40, uses the light intensity at each pixel for the white reference plate 55 and the light intensity at each pixel for each of the colorimetry images 69 to calculate the spectral reflectivity of each of the colorimetry images 69 from the equation (1). The sensor CPU 60 sends the calculated spectral reflectivity of each of the colorimetry images 69 to the apparatus CPU 40 and terminates the image colorimetry sequence.

[Comparison Between First Embodiment and Conventional Example]

Comparison between the control in the first embodiment and an example of conventional control will now be described. As conventional control, an example will be illustrated where data about all areas is output throughout the time period available for measurement per image of the colorimetry images 69. FIG. 7B illustrates a sequence diagram in the exemplary conventional control. The time period required for outputting data (hereinafter referred to as data acquisition time period) about the area A, described in the first embodiment, is 0.4 milliseconds in total: 0.2 milliseconds for light accumulation plus 0.2 milliseconds for data output. On the other hand, the data acquisition time period for all areas is 1.0 millisecond in total: 0.2 milliseconds for light accumulation plus 0.8 milliseconds for data output. If the time period available for measurement per image of the colorimetry images 69 is 40 milliseconds, data is detected 40 times at each pixel in the conventional example. In contrast, under the same condition, data is detected 56 times at each pixel in the area A and 28 times at each pixel in the area B in the first embodiment.

As described with respect to the Equation (1), the spectral reflectivity of the colorimetry images 69 is determined from the ratio between the reflected light intensity for the white reference plate 55 and the reflected light intensity for the colorimetry images 69. Therefore, wavelength ranges with small amounts of reflected light from the white reference plate 55 have narrow dynamic ranges at the time period of light detection. The wavelength ranges with narrow dynamic ranges may thus cause variations in detected spectral reflectivity of the colorimetry images 69. In other examples, in order to widen the dynamic ranges at the time period of light intensity detection, methods have been proposed that involve controlling to increase the amount of light of the LED 51 or changing the length of the light accumulation time period, in the wavelength ranges with small amounts of light. However, in these conventional examples, waiting time period may occur before the amount of light of the LED 51 stabilizes, or the colorimetry time period may be increased due to the increased accumulation time period. When the measurement time period is limited, such as when the color sensor 50 incorporated in the image forming apparatus 100 performs colorimetry while the sheet is being conveyed, these conventional examples are hard to be applied. Thus, in the first embodiment, within the time period available for measurement, the number of detection times at pixels that may have wider detection variations (pixels corresponding to wavelength ranges with smaller amounts of reflected light) is made greater than the number of detection times at the other pixels. In the first embodiment, since the measurement time period is not increased, the number of detection times at the pixels other than the pixels with the greater number of detection times is reduced compared with the number of detection times in the conventional example. Nevertheless, reducing the number of detection times at the pixels corresponding to wavelengths with narrower detection variations will not significantly influence the detection variations in spectral reflectivity of the colorimetry images 69. In this manner, in the first embodiment, the number of detection times at pixels receiving the light of lower light intensity from the white reference plate 55 is made greater than the number of detection times at pixels receiving the light of higher light intensity. This allows providing a spectral colorimetry apparatus capable of improving detection accuracy without increasing the time period required for performing colorimetry.

In the described example of the first embodiment, the pixels of the line sensor 54 are divided into the two groups: the group of pixels with a greater number of detection times and the group of pixels with a less number of detection times. The present invention, however, is not limited to determining the number of detection times by dividing the pixels into two groups. For example, the number of detection times may be individually determined for each pixel. Also, the described method of data output and acquisition involves alternately outputting and acquiring data about the two groups: the group of pixels with a greater number of detection times and the group of pixels with a less number of detection times. Again, the method of data output and acquisition is not limited to the alternate manner. For example, data may be acquired by repeating a process in which data about the group of pixels with a greater number of detection times is successively output twice, and then data about the group of pixels with a less number of detection times is output once.

The number of detection times at each pixel may also be determined based on the relative radiation intensity of the LED 51, rather than on the light intensity of the reflected light from the white reference plate 55. For example, FIG. 8A illustrates an example of setting the groups used to determine the number of detection times at each pixel. In FIG. 8A, the horizontal axis represents the wavelength [nm (nanometer)], and the ordinate indicates the relative radiation intensity of the LED. The horizontal axis also represents the pixel number (0 to 100) in the line sensor 54 such as a CMOS sensor, corresponding to each wavelength of the LED 51. For the wavelengths of the LED 51, the area A is defined to include pixels receiving light of wavelengths corresponding to relative radiation intensity of less than 0.5, and the area B is defined to include pixels receiving light of wavelengths corresponding to relative radiation intensity of 0.5 or higher, for example. The image colorimetry sequence described in the above first embodiment is then performed. This manner also allows achieving advantageous effects similar to those in the above-described manner, providing a color sensor with improved detection accuracy without increasing the time period required for performing colorimetry.

Further, the detection variation at each pixel may not necessarily be due to the configuration of the white reference plate 55 or the LED 51. If pixels having wider detection variations due to other factors are known in advance, the number of detection times at the pixels with wider detection variations may be made greater than the number of detection times at pixels with narrower detection variations. This also allows achieving advantageous effects similar to those in the above-described manner. In this case, the threshold for dividing wider variations and narrower variations may be predetermined based on experiments, for example. Thus, according to the first embodiment, colorimetry accuracy can be improved while preventing an increase in the colorimetry time period.

Second Embodiment

A second embodiment again uses the configuration of the image forming apparatus and the color sensor described in the first embodiment with reference to FIG. 1, FIGS. 2A and 2B, FIGS. 3A and 3B, FIG. 5 and FIG. 6. Therefore, the description of the image forming apparatus and the color sensor in the first embodiment will be applied and not be repeated here.

[Image Colorimetry Sequence]

With reference to a flowchart of FIG. 9, the following describes an image colorimetry sequence, and a method of determining the number of detection times at each pixel of the line sensor 54, which is a feature of the second embodiment. It is to be noted that the same processing steps as described in FIG. 4 in the first embodiment are labeled with the same step numbers, and S100 to S107 will not be described. In the second embodiment, however, the processing at S101 is not followed by the processing of determining areas for use in measuring the colorimetry images at S102 in FIG. 4. Also, after the light accumulation at S104, the sensor CPU 60 skips the determination and processing at S105 and S106 in FIG. 4 and performs the processing at S107, i.e., the data output and acquisition for all areas in the second embodiment. At S200, the sensor CPU 60 determines whether or not the number of times data was output and acquired (hereinafter referred to as the number of times of data acquisition) is n or more. If it is determined that the number of times of data acquisition is less than n, the sensor CPU 60 returns the process to S104. If it is determined that the number of times of data acquisition is n or more, the sensor CPU 60 advances the process to S201. In the second embodiment, by repeating the processing at S104 and S107, the sensor CPU 60 continues the light accumulation and the data output and acquisition until the number of times of data acquisition from one of the colorimetry images 69 reaches n. The number n as the threshold for the number of times of data acquisition may be determined in consideration of, for example, the time period available for measurement per image of the colorimetry images 69. The second embodiment assumes n=20, i.e., the number of times of measurement that makes up half the time period available for measurement.

At S201, the sensor CPU 60 calculates the magnitude of variation in output data at each pixel resulting from the detection. In the second embodiment, the magnitude of variations is defined as the difference between the maximum and the minimum of the ratio (hereinafter referred to as a light intensity ratio X) between the light intensity at each pixel for the colorimetry image 69 and the light intensity for the white reference plate 55. Equation (2-1) is an exemplary equation for calculating the light intensity ratio X(i) for a pixel number i, and Equation (2-2) is an exemplary equation for calculating the magnitude Vr(i) of variation. Xmax(i) and Xmin(i) respectively denote the maximum and the minimum of the light intensity ratio X(i).

light intensity ratio $X(i)$ [in %]={AD-converted detected value ($i$) for colorimetry image 69/AD-converted detected value ($i$) for white reference plate 55}×100   Equation (2-1)

magnitude of variation $Vr(i)$ [in %]=maximum $X$max ($i$) of light intensity ratio $X(i)$−minimum $X$min ($i$) of light intensity ratio $X(i)$   Equation (2-2)

Figure 10:
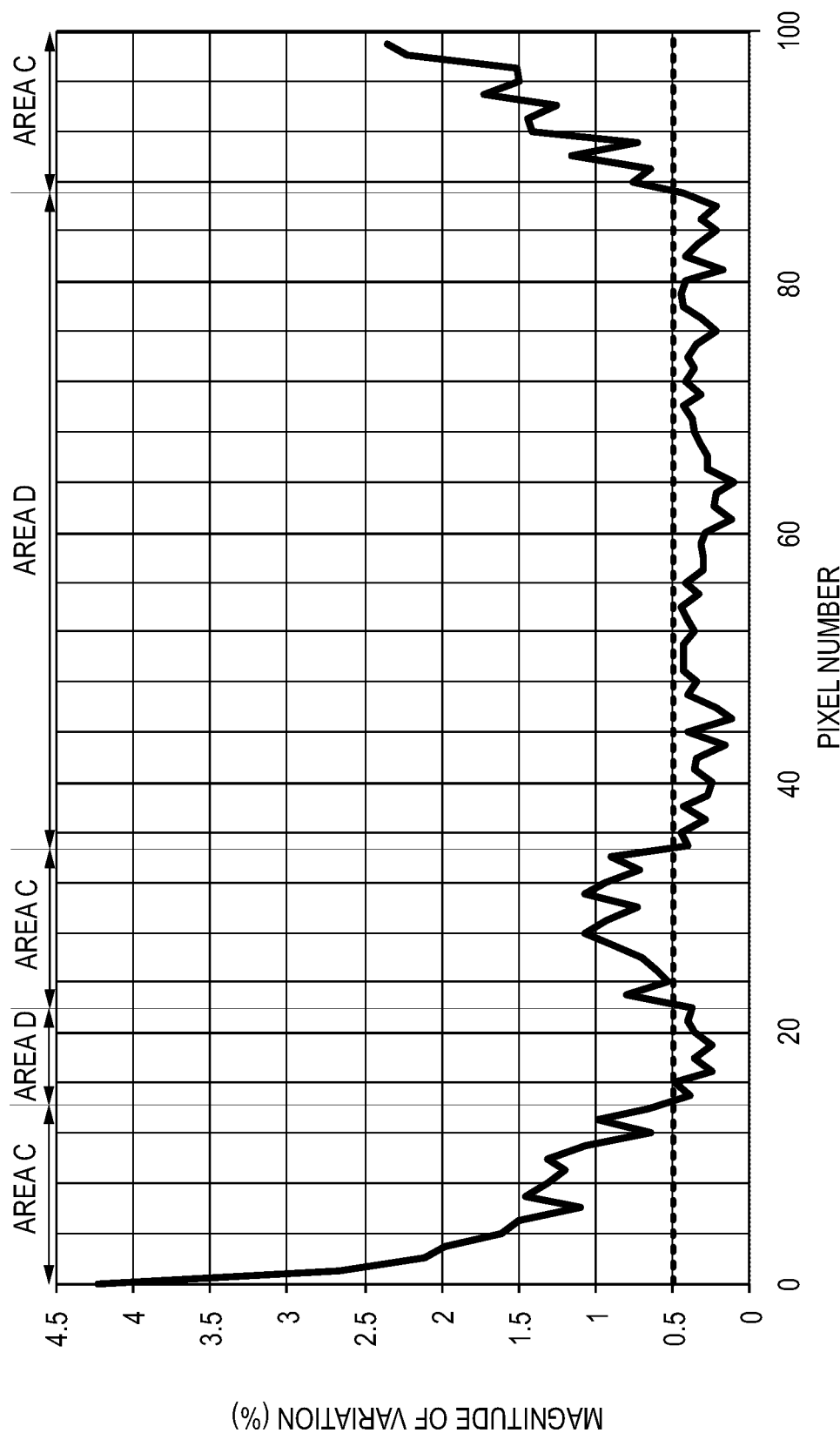
FIG. 10 is a diagram illustrating magnitudes of variation for the colorimetry images in the second embodiment.

FIG. 10 illustrates an example of the calculated magnitude Vr(i) of variation in output data at each pixel for the colorimetry image 69. In FIG. 10, the horizontal axis represents the pixel number (0 to 100) of the line sensor 54, and the ordinate indicates the magnitude [%] of variation in output data at each pixel. At S202, based on the magnitude Vr(i) of variation in output data at each pixel for the colorimetry image 69 calculated at S201, the sensor CPU 60 divides the pixels of the line sensor 54 into groups as follows. That is, the sensor CPU 60 divides the pixels of the line sensor 54 into a group (hereinafter referred to as an area C) of pixels with a greater number of detection times and a group (hereinafter referred to as an area D) of pixels with a number of detection times less than the number of detection times at the group of pixels in the area C. In the second embodiment, as illustrated in FIG. 10, the area C is defined to include pixels such that the magnitude Vr(i) of variation calculated at S201 is 0.5% or higher, and the area D is defined to include pixels such that the magnitude Vr(i) of variation calculated at S201 is below 0.5%. If no pixels have the magnitude Vr(i) of variation of 0.5% or higher, the area C is determined to include all pixels.

The method of determining the magnitude Vr(i) of variation in output data at each pixel for the colorimetry image 69 is not limited to the above-described manner. Rather, the magnitude Vr(i) of variation may be determined by calculating the variance of the light intensity ratio X(i) of each pixel over n times. Equation (3-1) is an equation for calculating the average X bar of the light intensity ratio X(i) over n times, and Equation (3-2) is an exemplary equation for calculating the magnitude of variation Vr(i).

$$\text{average } \overline{X} = \frac{1}{n}\sum_{i=0}^{n} X_i \quad \text{Equation (3-1)}$$

$$\text{magnitude of variation } Vr(i) = \frac{1}{n}\sum_{i=0}^{n} (\overline{X} - X_i)^2 \quad \text{Equation (3-2)}$$

At S203, the sensor CPU 60 accumulates light through the line sensor 54. At S204, the sensor CPU 60 performs data output and acquisition for the pixels determined to belong to the area C at S202. At S205, the sensor CPU 60 determines whether or not the measurement time period has elapsed by referring to the timer. Here, the measurement time period includes the time period in which the light accumulation was started at S104 and the data about all areas was output and acquired at S107, and it is determined whether or not there is remaining time period in the time period available for measurement per image of the colorimetry images 69. If it is determined that the measurement time period has not been elapsed at S205, the sensor CPU 60 returns the process to S203. If it is determined that the measurement time period has been elapsed, the sensor CPU 60 advances the process to S206.

FIG. 7C illustrates a sequence diagram in which the light accumulation and the data output are repeated during the measurement time period for one image in the second embodiment. Upon start of the measurement time period for one image, the sensor CPU 60 starts the light accumulation (S104). In the first data output, the sensor CPU 60 causes the line sensor 54 to output data about all areas (area C+area D) (S107). When the sensor CPU 60 has repeated the light accumulation (S104) and the data output for all areas (S107), for example N times, the sensor CPU 60 determines that the number of times of data acquisition is n or more (YES at S200). The sensor CPU 60 then starts the light accumulation (S203), and in the N+1th data output, the sensor CPU 60 causes the line sensor 54 to output data about the area C (S204). The sensor CPU 60 starts the light accumulation (S203), and in the N+2th data output, the sensor CPU 60 causes the line sensor 54 to output data about the area C (S204). This process is continued thereafter until the end of the measurement time period. At S206, the sensor CPU 60 averages the data about the colorimetry image 69 resulting from the multiple times of detection at each pixel, and regards the average for the pixel as the light intensity at the pixel for the colorimetry image 69. Here, since the area C and the area D had different detection frequencies after the n-th detection and thus produced different numbers of data items, averages of the respective frequencies are calculated. Processing at S110 to S112 is similar to the processing in FIG. 4 of the first embodiment and therefore will not be described.

As has been described, in the second embodiment, the magnitude of variation in detection result at each pixel for the colorimetry images 69 is calculated, and, within the total number of detection times that does not cause an increase in the measurement time period, the number of detection times at pixels with wider variations is made greater than the number of detection times at pixels with narrower variations. This allows providing a spectral colorimetry apparatus capable of improving detection accuracy without increasing the time period required for performing colorimetry.

Thus, according to the second embodiment, colorimetry accuracy can be improved while preventing an increase in the colorimetry time period.

Third Embodiment

A third embodiment again uses the configuration of the image forming apparatus and the color sensor described in the first embodiment with reference to FIG. 1, FIGS. 2A and 2B, FIG. 5 and FIG. 6. Therefore, the description of the image forming apparatus and the color sensor in the first embodiment will be applied and not be repeated here, and only differences from the first embodiment will be described.

[Configuration]

Figure 3B:
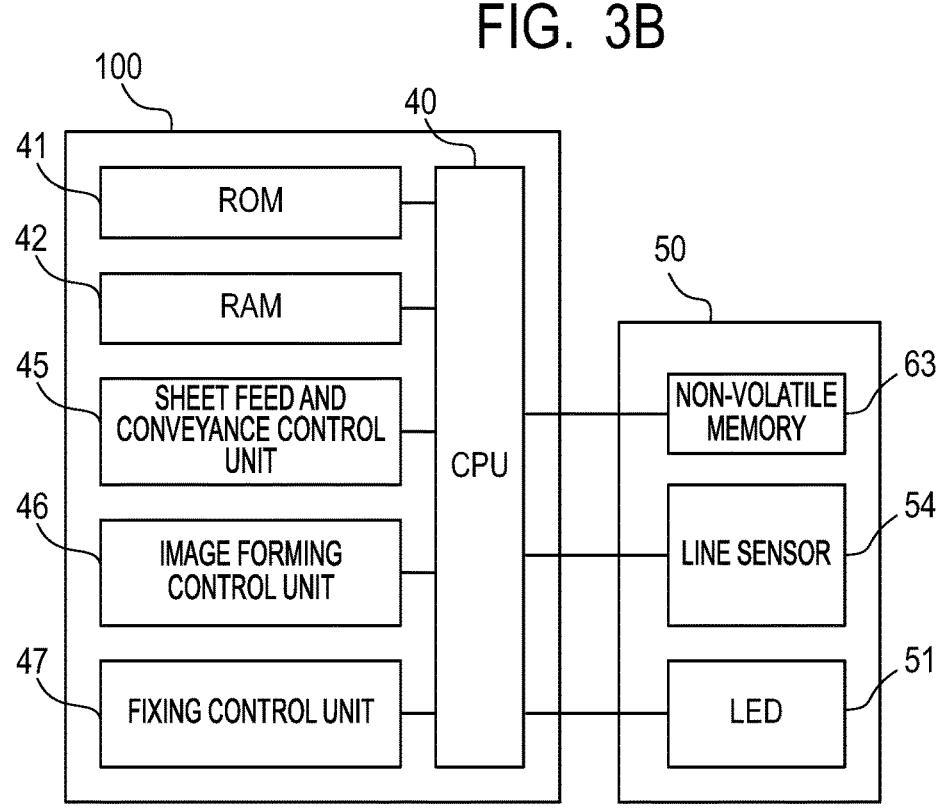
FIG. 3B is a control block diagram of the color sensor.

FIG. 3B is a block diagram illustrating a control configuration of the image forming apparatus 100 and the color sensor 50 in the third embodiment. Components of the image forming apparatus 100 and the color sensor 50 are the same as in the first embodiment described with reference to FIG. 3A. In the third embodiment, the color sensor 50 does not have the sensor CPU 60, the ROM 61, and the RAM 62. The apparatus CPU 40 in the third embodiment is connected with the non-volatile memory 63, the LED 51, and the line sensor 54 of the color sensor 50. The apparatus CPU 40 uses the RAM 42 as a working area to perform control relevant to the third embodiment based on program code stored in the ROM 41. The sheet feed and conveyance control unit 45, the image forming control unit 46, and the fixing control unit 47 are the same as in FIG. 3A described in the first embodiment and therefore will not be described.

The apparatus CPU 40 and the line sensor 54 sends and receives, via a signal line, a reflected light accumulation instruction signal, a spectral data reading instruction signal, and an analog spectral data output signal. Here, the reflected light accumulation instruction signal is a signal for indicating the accumulation time period of reflected light. The spectral data reading instruction signal is a signal for instructing to start and halt reading spectral data acquired by the line sensor 54. The analog spectral data output signal is a signal for outputting multiple spectral data items (analog values of the amounts of light) acquired by the line sensor 54.

The line sensor 54 is a charge-storage line sensor and sequentially outputs a voltage signal for each pixel in ascending order of pixel number, for a certain time period for each pixel, according to the intensity of dispersed light incident in a predetermined accumulation time. The line sensor 54 in the third embodiment cannot output a voltage signal for a specific pixel by specifying the pixel number of the line sensor 54. The LED 51 in the third embodiment presents a spectral shape similar to the spectral shape in FIG. 2B. The LED 51 used in the third embodiment has lower relative radiation intensity in some portions on the short-wavelength side (400 to 520 nanometers) than on the long-wavelength side (520 to 700 nanometers). Therefore, the diffraction grating 53 and the line sensor 54 are arranged so that output of spectral data acquired by the line sensor 54 causes voltages to be sequentially output starting at pixels that receive light of wavelengths on the short-wavelength side. In the third embodiment, the light accumulation time period of the line sensor 54 is 0.2 milliseconds, and the time period required for outputting voltage signals for all pixels is 0.8 milliseconds. The apparatus CPU 40 uses a 12-bit AD converter (not shown) to AD-convert the voltage signal obtained for each pixel, thereby acquiring the light intensity detected at the pixel as a value in the range 0 to 4095.

The non-volatile memory 63 holds wavelength information corresponding to each pixel of the line sensor 54. The amount of light emitted by the LED 51 is adjustable by the apparatus CPU 40 as appropriate. The apparatus CPU 40 uses the color sensor 50 to perform LED turn-on control, LED turn-off control, reference plate measurement control, image measurement control, and spectral reflectivity calculation control. The LED turn-on control causes the LED 51 to illuminate with a predetermined amount of light so that the value of the peak pixel for the white reference plate 55 obtained by driving the line sensor 54 is around the detection limit value of the line sensor 54 (in the third embodiment, around 4000 after AD conversion). The LED turn-off control turns off the LED 51. The reference plate measurement control drives the line sensor 54 multiple times to measure the light intensity at each pixel for the white reference plate 55, and calculates the average of the measurements at the pixel. In the third embodiment, the measurement is performed 32 times. The image measurement control drives the line sensor 54 multiple times in a specified time period to measure the light intensity at each pixel for the colorimetry images 69, and calculates the average of the measurements at the pixel. The number of measurement times performed upon reception of the image measurement instruction is a feature of the third embodiment and will be described in detail below. The spectral reflectivity calculation control calculates, based on the measurement results about the white reference plate 55 and the colorimetry images 69, the spectral reflectivity Or(λ) of each patch at each wavelength λ from Equation (1). Equation (1) is the same as described in the first embodiment and will not be described again.

[Image Colorimetry Sequence]

With reference to a flowchart of FIG. 11, the following describes an image colorimetry sequence, and a method of determining the number of detection times at each pixel of the line sensor 54, which is a feature of the third embodiment. At S300, the apparatus CPU 40 performs the LED turn-on control to cause the LED 51 to illuminate with a predetermined amount of light. At S301, the apparatus CPU 40 performs the reference plate measurement control to measure the light intensity at each pixel for the white reference plate 55. At S302, based on information about the relative radiation intensity of the LED 51, the apparatus CPU 40 divides the pixels of the line sensor 54 into a group (hereinafter referred to as an area E) of pixels with a greater number of detection times and a group (hereinafter referred to as an area F) of pixels with the number of detection times less than the number of detection times at the pixels in the area E. In the third embodiment, the area E is defined to include pixels that receive light on the short-wavelength side (for example, 400 to 510 nm) where the relative radiation intensity of the LED 51 is lower, and the area F is defined to include pixels that receive light on the following long-wavelength side (511 to 700 nm). That is, the number of detection times at pixels corresponding to wavelengths shorter than a predetermined wavelength (for example, 511 nm) and the number of detection times at pixels that receive light of wavelengths longer than the predetermined wavelength are differentiated. FIG. 8B illustrates an example of setting the groups used to determine the detection frequencies in the third embodiment. FIG. 8B is a graph similar to FIG. 8A.

At S303, the apparatus CPU 40 forms the colorimetry images 69, feeds the sheet 21, transfers and fixes the colorimetry images 69 onto the sheet 21, and conveys the colorimetry images 69 on the sheet 21 to the position of the color sensor 50. At S304, the apparatus CPU 40 performs image measurement control for one of the colorimetry images 69 on the sheet 21 being conveyed. The apparatus CPU 40 drives the line sensor 54 to start accumulation of the amount of reflected light from the colorimetry image 69 (light accumulation). The apparatus CPU 40 also resets and starts the timer (not shown). Upon completion of the light accumulation for a predetermined time period, at S305, the apparatus CPU 40 drives the line sensor 54 to start outputting spectral data acquired by the line sensor 54.

At S306, the apparatus CPU 40 determines, for the one of the colorimetry images 69, whether or not the data output is the even-numbered output. If it is determined that the data output is the even-numbered output at S306, the apparatus CPU 40 advances the process to S307. If it is determined that the data output is not the even-numbered output, the apparatus CPU 40 advances the process to S308. At S307, the apparatus CPU 40 performs data output and acquisition for the pixels determined to belong to the area E at S302 and, upon completing the data output and acquisition for the area E, the apparatus CPU 40 drives the line sensor 54 to halt the spectral data output. At S308, the apparatus CPU 40 does not halt the spectral data output unlike in S307, but performs data output and acquisition for all areas and advances the process to S309.

At S309, the apparatus CPU 40 determines whether or not the measurement time period has elapsed. If it is determined that the measurement time period has not been elapsed, the apparatus CPU 40 returns the process to S304. If it is determined that the measurement time period has been elapsed, the apparatus CPU 40 advances the process to S310. In this manner, the apparatus CPU 40 repeats the light accumulation and the data output and acquisition for the area E (S307) or for all areas (S308) as described above until the end of the time period available for measurement per image of the colorimetry images 69. FIG. 7D illustrates a sequence diagram in which the light accumulation and the data output are repeated during the measurement time period for one image in the third embodiment. Upon start of the measurement time period for one image, the apparatus CPU 40 starts the light accumulation (S304). Since the first data output is not the even-numbered output (NO at S306), the apparatus CPU 40 causes the line sensor 54 to output data about all areas (area E+area F) (S308). The data output at this time is the first data output for the area E and the first data output for the area F. The apparatus CPU 40 starts the light accumulation (S304), and since the second data output is the even-numbered output (YES at S306), the apparatus CPU 40 causes the line sensor 54 to output data about the area E (S307). The data output at this time is the second data output for the area E. The apparatus CPU 40 starts the light accumulation (S304), and since the third data output is not the even-numbered output (NO at S306), the apparatus CPU 40 causes the line sensor 54 to output data about all areas (area E+area F) (S308). The data output at this time is the third data output for the area E and the second data output for the area F. The apparatus CPU 40 starts the light accumulation (S304), and since the fourth data output is the even-numbered output (YES at S306), the apparatus CPU 40 causes the line sensor 54 to output data about the area E (S307). The data output at this time is the fourth data output for the area E. This process is continued thereafter until the end of the measurement time period.

At S310, the apparatus CPU 40 averages the data about the colorimetry image 69 resulting from the multiple times of detection at each pixel, and regards the average for the pixel as the light intensity at the pixel for the colorimetry image 69. Here, since the area E and the area F had different detection frequencies and thus produced different numbers of data items, averages of the respective frequencies are calculated. At S311, the apparatus CPU 40 determines whether or not the processing of determining the light intensity has been completed for all of the colorimetry images 69. If it is determined that the processing has not been completed for all colorimetry images, the apparatus CPU 40 returns the process to S304. If it is determined that the processing has been completed for all colorimetry images, the apparatus CPU 40 advances the process to S312. At S312, the apparatus CPU 40 discharges the sheet 21 out of the image forming apparatus 100. At S313, the apparatus CPU 40 uses the light intensity at each pixel for the white reference plate 55 and the light intensity at each pixel for each of the colorimetry images 69 to calculate the spectral reflectivity of each of the colorimetry images 69 from Equation (1), and completes the image colorimetry sequence.

As has been described, when the line sensor configured to sequentially output spectral data at each pixel is used, the line sensor is arranged to output spectral data starting at pixels that receive light at wavelengths of lower-intensity light of the LED 51. Then, in the process of detecting the spectral data multiple times, the spectral data output is periodically halted. In this manner, within the total number of detection times that does not cause an increase in the measurement time period, the number of detection times at pixels that receive lower-intensity light is made greater than the number of detection times at pixels that receive higher-intensity light. This allows providing an image forming apparatus capable of improving detection accuracy without increasing the time period required for performing colorimetry.

In the third embodiment, as described with reference to the block diagram of the control configuration in FIG. 3B, the control of determining the number of detection times at each pixel of the line sensor 54 has been described as being performed by the apparatus CPU 40. However, as described in the first embodiment with reference to the block diagram of the control configuration in FIG. 3A, in the configuration with the sensor CPU 60 included in the color sensor 50, the sensor CPU 60 may determine the number of detection times at each pixel of the line sensor 54. This manner also allows achieving advantageous effects similar to those in the above-described manner, providing a color sensor with improved detection accuracy without increasing the time period required for performing colorimetry.

Thus, according to the third embodiment, colorimetry accuracy can be improved without increasing the colorimetry time period.

Other Embodiments

The present invention is also achieved by providing, to a system or an apparatus, a storage medium having stored therein program code of software that implements functions of the embodiments. That is, the present invention is also achieved by a computer (or a CPU or an MPU) of the system or the apparatus reading and executing the program code stored in the storage medium. In this case, the program code itself read from the storage medium implements the functions of the above-described embodiments, and the storage medium having the program code stored therein is included in the present invention. Storage media usable for supplying such program code include, for example, a Floppy® disk, a hard disk, an optical disc, a magneto-optical disk, a CD-ROM, a CD-R, a magnetic tape, a non-volatile memory card, and a ROM.

In addition to the computer executing the read program code to implement the functions of the above-described embodiments, the present invention also encompasses the case where an OS (Operating System) running on a computer performs part or all of actual processing based on instructions of the program code to implement the functions of the above-described embodiments.

The present invention further encompasses the case where the program code read from the storage medium is written to memory in a function expansion board inserted to a computer or in a function expansion unit connected to a computer. The present invention also encompasses the case where, after the program code is written to the memory, a CPU in the function expansion board or in the function expansion unit performs part or all of actual processing based on instructions of the program code to implement the functions of the above-described embodiments.

The present invention also encompasses the case where the program code of the software implementing the functions of the above-described embodiments is distributed via a network. The present invention also encompasses the case where the program code is stored via a network in a storage unit such as a hard disk or memory in a system or apparatus, or in a storage medium such as a CD-RW or a CD-R. Of course, the functions of the above-described embodiments are also achieved by a computer (or a CPU or an MPU) of a system or an apparatus reading and executing the program code stored in the storage unit or in the storage medium.

Thus, colorimetry accuracy can be improved while preventing an increase in the colorimetry time period according to other embodiments as well.

According to the present invention, colorimetry accuracy can be improved while preventing an increase in the colorimetry time period.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-236512, filed Dec. 8, 2017, which is hereby incorporated by reference herein in its entirety.

What is claimed is:

1. A spectral colorimetry apparatus comprising:
a light source configured to emit light to an object;
a spectral unit configured to disperse the light reflected from the object;
a line sensor having pixels, the line sensor configured to receive the light dispersed by the spectral unit at the pixels for respective wavelengths to output a voltage according to intensity of the light received; and
a control unit configured to calculate spectral reflectivity of the object based on the intensity of the light reflected from the object,
wherein the control unit controls a first number of detection times at the pixels receiving the light of the wavelengths shorter than a predetermined wavelength so that the first number of detection times is greater than a second number of detection times at the pixels receiving the light of the wavelengths equal to or longer than the predetermined wavelength.

2. A spectral colorimetry apparatus according to claim 1, comprising a reference plate for calibrating output from the line sensor,
wherein the control unit calculating the spectral reflectivity of the object based on intensity of light reflected from the reference plate and the intensity of the light reflected from the object.

3. A spectral colorimetry apparatus according to claim 2, wherein the control unit determines the number of detection times based on a result of detecting the light reflected from the reference plate at the pixels.

4. A spectral colorimetry apparatus according to claim 2, wherein the control unit controls the first numbers of detection times at the pixels so that the number of the detection times at the each of the pixels receiving light reflected from the reference plate of the light intensity lower than the predetermined light intensity is greater than the second number of the detection times at the each of pixels receiving light of the light intensity equal to or greater than the predetermined light intensity.

5. A spectral calorimetry apparatus according to claim 2, wherein the control unit performs detection at the pixels until the first number of detection times for the object reaches a predetermined number of detection times, and after the first number of detection times for the object reaches the predetermined number of detection times, the control unit performs detection at pixels receiving light of light intensity lower than predetermined intensity among the pixels.

6. A spectral colorimetry apparatus according to claim 5, wherein the first predetermined number of detection times is determined according to a time period required for measuring the object.

7. A spectral colorimetry apparatus according to claim 5, wherein after the number of the first detection times reaches the predetermined number of detection times, the control unit detects the light reflected from the object at pixels at which a variation in values detected before the number of the first detection times reaches the predetermined number of detection times is wider than a predetermined variation.

8. A spectral colorimetry apparatus according to claim 7, wherein the control unit calculates the predetermined variation at a predetermined pixel based on a maximum and a minimum of the intensity of the light reflected from the object and detected at the predetermined pixel.

9. A spectral colorimetry apparatus according to claim 1, wherein the spectral unit and the line sensor are arranged so that the voltage is output in an order from the pixels receiving the light of the wavelengths shorter than the predetermined wavelength to the pixels receiving the light of the wavelengths equal to or longer than the predetermined wavelength, and
  wherein in order to control the first number of detection times at the pixels receiving the light of the wavelengths shorter than the predetermined wavelength to be greater than the second number of detection times at the pixels receiving the light of the wavelengths equal to or longer than the predetermined wavelength, in detection of the pixels receiving the light of the wavelengths shorter than the predetermined wavelength, in a case where the voltage output for the pixel receiving the light of the wavelengths shorter than the predetermined wavelength is output, the control unit halts outputting the voltage from the pixels receiving the light equal to or greater than the predetermined wavelength.

10. A spectral colorimetry apparatus according to claim 1, wherein the control unit performs detection at the pixels until the first number of detection times for the object reaches a predetermined number of detection times, and after the first number of detection times reaches the predetermined number of detection times, the control unit performs the detection at pixels receiving light of light intensity lower than predetermined intensity among the pixels.

11. A spectral colorimetry apparatus according to claim 10, wherein the predetermined number of detection times is determined according to a time period required for measuring the object.

12. A spectral colorimetry apparatus according to claim 10, wherein after the first number of detection times reaches the predetermined number of the detection times, the control unit detects the light reflected from the object at pixels whose variation in detected values detected before the number of detection times reaches the predetermined number of detection times is wider than a predetermined variation.

13. A spectral colorimetry apparatus according to claim 12, wherein the control unit calculates the predetermined variation at a predetermined pixel based on a maximum and a minimum of the intensity of the light reflected from the object and detected at the predetermined pixel.

14. An image forming apparatus comprising:
a spectral colorimetry apparatus according to claim 1;
a forming unit configured to form a measurement image on a recording material as the object; and
a fixing unit configured to fix the measurement image formed by the forming unit on the recording material,
wherein the spectral colorimetry apparatus is provided downstream of the fixing unit in a conveyance direction of the recording material, and
the spectral colorimetry apparatus performs colorimetry on the measurement image fixed by the fixing unit onto the recording material.

15. An image forming apparatus comprising:
a forming unit configured to form a measurement image on a recording material as an object;
a fixing unit configured to fix the measurement image formed by the forming unit on the recording material;
a spectral colorimetry apparatus provided downstream of the fixing unit in a conveyance direction of the recording material, the spectral colorimetry apparatus configured to perform colorimetry on the measurement image fixed by the fixing unit onto the recording material; and
a control unit configured to control an image forming condition based on a result of the colorimetry performed by the spectral colorimetry apparatus, the spectral colorimetry apparatus comprising:
a light source configured to emit light to an object;
a spectral unit configured to disperse the light reflected from the object; and
a line sensor having pixels, the line sensor configured to receive the light dispersed by the spectral unit at the pixels for respective wavelengths to output a voltage according to intensity of the light received,
wherein the control unit controls a first number of detection times at the pixels receiving the light of the wavelengths shorter than a predetermined wavelength so that the first number of detection times is greater than a second number of detection times at the pixels receiving the light of the wavelengths equal to or longer than the predetermined wavelength.

16. A spectral colorimetry apparatus comprising;
a light source configured to emit light to an object;
a spectral unit configured to disperse the light reflected from the object;
a line sensor having pixels, the line sensor configured to receive the light dispersed by the spectral unit at the pixels for respective wavelengths to output a voltage according to intensity of the light received; and
a control unit configured to calculate spectral reflectivity of the object based on the intensity of the light reflected from the object,
wherein the control unit performs a control of detection at the pixels until a number of detection times for the object reaches a predetermined number of detection times, and after the number of detection times reaches the predetermined number of the detection times, the control unit performs the control of the detection at pixels receiving light of light intensity lower than predetermined intensity among the pixels.

17. An image forming apparatus comprising:
a forming unit configured to form a measurement image on a recording material as an object;
a fixing unit configured to fix the measurement image formed by the forming unit on the recording material;
a spectral colorimetry apparatus provided downstream of the fixing unit in a conveyance direction of the recording material, the spectral colorimetry apparatus configured to perform colorimetry on the measurement image fixed by the fixing unit onto the recording material; and a control unit configured to control an image forming condition based on a result of the colorimetry performed by the spectral colorimetry apparatus, the spectral colorimetry apparatus comprising:

a light source configured to emit light to an object;

a spectral unit configured to disperse the light reflected from the object; and a line sensor having pixels, the line sensor configured to receive the light dispersed by the spectral unit at the pixels for respective wavelengths to output a voltage according to intensity of the light received, wherein the control unit performs a control of detection at the pixels until a number of detection times for the object reaches a predetermined number of detection times, and after the number of the detection times reaches the predetermined number of the detection times, the control unit performs the control of the detection at pixels receiving light of light intensity lower than predetermined intensity among the pixels.

* * * * *